US012633190B2

(12) United States Patent
Indrakumar et al.

(10) Patent No.: US 12,633,190 B2
(45) Date of Patent: May 19, 2026

(54) MULTI-SIDED SLOT WAGERING GAME

(71) Applicant: Innowheel LLC, Las Vegas, NV (US)

(72) Inventors: Kuppam Indrakumar, Las Vegas, NV (US); Vanita Q. Indrakumar, Las Vegas, NV (US); Vidya Q. Indrakumar, Las Vegas, NV (US)

(73) Assignee: Innowheel LLC, Las Vegas, NV (US)

( * ) Notice: Subject to any disclaimer, the term of this patent is extended or adjusted under 35 U.S.C. 154(b) by 381 days.

(21) Appl. No.: 18/113,060

(22) Filed: Feb. 23, 2023

(65) Prior Publication Data

US 2024/0038016 A1 Feb. 1, 2024

Related U.S. Application Data

(63) Continuation-in-part of application No. 17/874,318, filed on Jul. 27, 2022, now Pat. No. 11,615,670.

(51) Int. Cl.
*G07F 17/32* (2006.01)

(52) U.S. Cl.
CPC ........ *G07F 17/3213* (2013.01); *G07F 17/323* (2013.01); *G07F 17/3265* (2013.01)

(58) Field of Classification Search
CPC . G07F 17/3213; G07F 17/323; G07F 17/3265
See application file for complete search history.

(56) References Cited

U.S. PATENT DOCUMENTS

| | | | | |
|---|---|---|---|---|
| 5,344,145 | A * | 9/1994 | Chadwick | A63F 9/04 463/31 |
| 7,331,858 | B2 * | 2/2008 | McComb | G07F 17/3213 463/16 |
| 8,133,111 | B2 * | 3/2012 | Thomas | G07F 17/3211 463/20 |
| 8,414,380 | B2 * | 4/2013 | Saunders | G07F 17/34 463/31 |
| 10,607,448 | B2 * | 3/2020 | Nicely | G07F 17/3267 |
| 2001/0016513 | A1 * | 8/2001 | Muir | G07F 17/34 463/16 |
| 2009/0061983 | A1 * | 3/2009 | Kaufman | G07F 17/3211 463/43 |

* cited by examiner

*Primary Examiner* — Dmitry Suhol
*Assistant Examiner* — Jason Pinheiro
(74) *Attorney, Agent, or Firm* — Bayramoglu Law Offices

(57) ABSTRACT

A slot wagering game device configured to: present a plurality of rotators on a display, wherein each rotator of the plurality of rotators has at least two sides; each of the at least two sides is associated to a multimedia element, and one of the at least two sides rotated to a back of the rotator is not displayed, and wherein the plurality of rotators are arranged in a table format with at least one row and at least one column; obtain a hidden list for each rotator, wherein the hidden list contains a list of multimedia elements; and when a user pushes the play button, each of the plurality of rotators rotates and stops at a new position, wherein each time a side of a rotator is rotated to the back of the rotator, the side is re-associated to a different multimedia element selected from the hidden list.

19 Claims, 25 Drawing Sheets

2-sided with strip of images to use while rotating 2-sided Front

Background Strip

5 Sided Rotator

FIG. 5B
Innowheel Games
Change Bet
Change Line
Welcome and Good Luck

FIG. 5F
Innowheel Games
Welcome and Good Luck

Rotator Game Pay lines

Rotator Game Pay Boxes

MULTI-SIDED SLOT WAGERING GAME

CROSS-REFERENCE OF THE RELATED APPLICATION

This application is a continuation-in-part (CIP) application of U.S. patent application Ser. No. 17/874,318 filed on Jul. 27, 2022, the entire content of which is incorporated herein by reference.

TECHNICAL FIELD

The instant disclosure relates to the technical field of slot wagering games and user customizations of the slot wagering games.

BACKGROUND

Conventional slot wagering games rely on a rolling effect of an overall reel. The reel may be separated into multiple portions configured to be rolled at different times with different speeds. Each portion of the reel is further divided into slots and the slots are populated with a group of images. Based on the stop position after each roll, the slots having same or similar images form connecting lines, which determines gain or loss of each roll.

However, the dependency on an overall reel limits the development of slot wagering game designs. It not only limits the ways that a winning line can be constructed, but also limits the ways that a slot wagering game can be presented to users. Therefore, in order to attract users, there is a need for a new game play and a new presentation of slot wagering games.

SUMMARY

In this respect, before explaining at least one embodiment in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

One purpose of the instant invention is to provide a solution for the above deficiency and improve the users experience in slot wagering gaming. The approach is to introduce multiple rotators into a slot wagering game and remove the need of an overall reel. To be more specific, the instant invention replaces the reels used in conventional slot games, with a system of rows and columns of multi-sided two dimensional (2D) or three dimensional (3D) objects, called rotators. Each face of the rotator object can contain an image (including a normal image, a blank image, a wild image, or a scatter image), a symbol, an animation, or a video. Instead of rotating reels, these rotators can rotate in place in a matrix and the outcome of the game is based on where the rotators stop instead of a reel stop. In the case of presenting the rotators as 2D objects, each rotator can be displayed as a 2D presentation of a cylinder or reel having each multimedia element being shown in turn. In the case of presenting the rotators as 3D objects, each rotator can be displayed as a three-dimensional rotator that rotates with each multimedia element shown in each side of the three-dimensional rotator.

By arranging the rotators in the matrix, winning lines of the slot wagering game can be vertical lines as opposed to conventionally the winning lines are limited to horizontal and oblique lines due to the use of a reel. Furthermore, in conventional games the probability of an image landing on a line depends on the reel, and with the instant invention, the image landing on a line is based on each rotator. In one embodiment, the probability of occurrence of an image depends on the number of rotators in the screen. Also, conventionally, the rotation speeds are the same due to the use of reels, and each reel stops at different times, usually from left to right. On the contrary, in the instant invention, each rotator can spin in different directions and at different speeds, and stops at different times. In one embodiment, the rotators can be slowed down at the beginning, at the end, in the middle, or during the entire game. For example, before the end of the game any number of rotators can be configured to slow down to increase anticipation.

The game math which sets winning conditions of the game is based on the rotators. For example, a game can include a winning condition based on landing Aces or Kings on all rotators, partial rotators forming a horizontal line, partial rotators forming a vertical line, or other combinations thereof. In one embodiment, the games can be designed a winning condition with multiple combinations. For example, landing two Kings, two Queens, and one Jack on rotators forming a vertical, horizontal, or oblique line. In another embodiment, users/players can customize the combinations.

In one embodiment, the instant invention discloses a slot wagering game device, comprising: a processor; a memory storing computer readable instructions; a display; a user interface including a play button; wherein when the computer readable instructions are executed by the processor, cause the device to: present a plurality of rotators on the display, wherein each rotator of the plurality of rotators has at least two sides; each of the at least two sides is associated to a multimedia element (e.g. an image, a symbol, an animation, or a video), and one of the at least two sides rotated to a back of the rotator is not displayed, and wherein the plurality of rotators are arranged in a table format with at least one row and at least one column; obtain a hidden list for each rotator, wherein the hidden list contains a list of multimedia elements; and when a user pushes the play button, each of the plurality of rotators rotates and stops at a new position, wherein each time a side of a rotator is rotated to the back of the rotator, the side is re-associated to a different multimedia element selected from the hidden list.

The disclosed slot wagering game device can be played on a Gaming Machine, an Electronic Gaming Machine (EGM), a mobile device, a virtual-reality system, or on a website. The slot wagering game device further requires a display device to render or display the game and its various outcomes, an input interface for receiving a user's action such as play, insert money or voucher, and a speaker for playing sounds or music. The disclosed slot wagering game device is implemented by a CPU, a memory, an I/O interface, operating systems, and software.

In one embodiment, the user interface further includes a change bet button configured to receive a new betting value from the user and a change line button configured to receive a modification of a betting line from the user.

In another embodiment, the disclosed slot wagering game device is configured to generate information about each rotator, the multimedia element associated with each rotator, and the hidden list for each rotator by a local processor within the slot wagering game device; and when the user pushes the play button, a button push command is transmitted to the local processor and the local processor issues commends to rotate each of the plurality of rotators. This allows the disclosed slot wagering game to be played offline.

In another embodiment, the disclosed slot wagering game device is further configured to receive information about each rotator, the multimedia element associated with each rotator, and the hidden list for each rotator from a cloud server; and when the user pushes the play button, transmit a button push command to the cloud server and receive information about how to rotate each of the plurality of rotators from the cloud server, before rotating each of the plurality of rotators. This allows the disclosed slot wagering game to be played online or remotely without the user needing to download a whole slot wagering game software to a local device, thereby offering the users an easy access to the game.

In one embodiment, the rotators have different heights, widths, and depths, and the heights, widths, and depths of the rotators are adjustable during or between rotations. In another embodiment, the slot wagering game device is configured to apply a special effect on at least one rotator, wherein the special effect includes, but is not limited to, jiggle, explode, or fade. In specific, after a game ends, a rotator can explode, fade out and reveal a value that the player won. Special (i.e. predetermined) rotators in the game can jiggle and drop coins or values to the credit the player.

In further embodiment, the disclosed slot wagering game device can utilize features such as Wilds, Scatters, Bonus games, and Wheels, for user engagements. Also, the rotators can be presented in wavy motions. The wavy motions can be achieved by using water as background and placing rotators on top. When water makes sinusoidal wave motion, the rotators can move up and down in wavy motion. Similarly, if the background is made to be space with *meteors* projecting towards the screen, the rotators may look like moving in space. The rotators can be presented with sharp edges or smooth or rounded edges. Furthermore, the multimedia elements associated with the rotators can be displayed with bevel, shadow, glow, frame, or other enhancements. Three-dimensional (3D) shaders can be used on backgrounds, multimedia elements, and the rotators to enhance the visualization. Moreover, each rotator can be turned on to rotate while other rotators are in their stop positions. In one embodiment, the rotating rotator can be emphasized for mysterious reveal with lightings or special effects. In another embodiment, the emphasized rotator for mysterious reveal can be used in bonus games. These features provide visual effects during different stages or at different events of the game, which attract the user's attention.

In one embodiment, the spaces between the rotators will adjust automatically when game screen is reduced or increased to keep up with uniformity. These adjustments make the game look pleasing in various screen sizes. In another embodiment, the size of the rotators will also be adjusted to accommodate the size of the game screen.

In one embodiment, each of the rotators can have different number of sides, which causes the rotators to have different probabilities of landing on a particular side.

For a rotator having at least three sides, a top view and a bottom view can also be displayed. The rotators can be presented in an orthogonal projection or in a perspective projection with respect to the user's eye.

In one embodiment, one or more rotators can be a hidden rotator configured to be shown according to a predetermined event or during a specific game stage.

In one embodiment, the background of the game changes based on different occasions including, but are not limited to, different seasons or different holidays.

In a preferred embodiment of the instant invention, the disclosed slot wagering game device is further configured to provide a graphic user interface to the user, wherein the graphic user interface shows to the user a list of multimedia elements to be used by the plurality of rotators; the graphic user interface further presents dropdown menus or text input fields to receive inputs from the user on number of sides, game matrix rows, game matrix columns, background, rotation type, width, height, and depth; populating the list of multimedia elements into the plurality of rotators based on the number of sides, the game matrix rows, the game matrix columns, the background, the rotation type, the width, the height, and the depth inputted by the user; and displaying a populated result for each of the plurality of rotators on the graphic user interface.

The graphic user interface further includes a generate button configured to initiate the populating of the list of multimedia elements in response to a click by the user, a reset button configured to remove the population of the list of multimedia elements in response to a click by the user, and a game title field configured to receive a game name from the user for identifying the population of the list of multimedia elements. In one embodiment, the rotation type is selected from the group consisting of clockwise, counter-clockwise, vertical, and horizontal.

In another embodiment of the instant invention, the disclosed slot wagering game device is further configured to provide a math calculation graphic user interface. The math calculation graphic user interface includes a pay value section displaying multiple pay value fields for each of the multimedia elements, wherein each of the multiple pay value fields contains a pay value set by the user, and the pay value indicates a reward credit amount when the corresponding multimedia element appears a predetermined number of times in a winning line; a probability calculation section displaying a probability for each pay value to be triggered and paid out; a line setting section displaying a visual representation of a line set among the plurality of rotators, wherein the line set includes a number of lines set by the user, and each line includes a plurality of locations; and a theoretical percentage section displaying a theoretical percentage number indicating a percentage of the credit estimated to be paid out among credits received by the slot wagering game device.

The game generating graphic user interface and the math calculation graphic user interface can be used together to create games with predetermined probability parameters. In one embodiment, the user can view the game generating graphic user interface and the math calculation graphic user interface at the same time and use the probability values obtained from the math calculation graphic user interface to adjust the game creation parameters in the game generating graphic user interface.

BRIEF DESCRIPTION OF THE DRAWINGS

In the drawings, various embodiments of the present devices and features are illustrated by way of example. It is to be expressly understood that the description and drawings are only for the purpose of illustration.

DETAILED DESCRIPTION OF THE EMBODIMENTS

The invention describes a new slot wagering game device that goes beyond the limitations of a conventional slot wagering game device. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement.

Figure 1A:
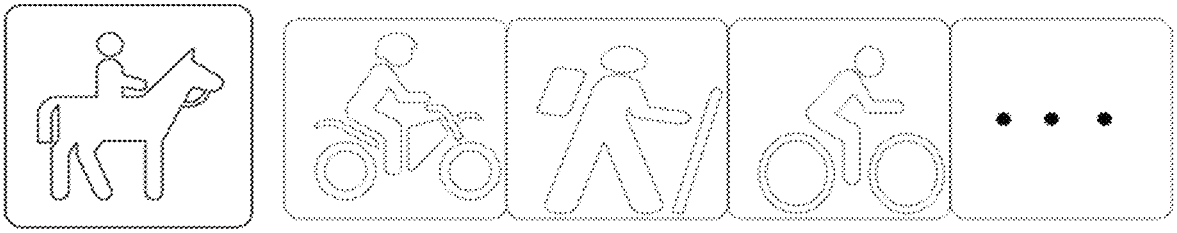
FIG. 1A illustrates a two-sided rotator with a strip of images to use while rotating.

Referring to FIG. 1A, a two-sided rotator can have images on front and back. The two-sided rotator is rotated and when the rotator stops, one of the two sides is designated as a front side and is presented on the display, and the other side is designated as a back side and is not displayed. It is also possible to change the multimedia element associated with the back side with a new multimedia element from a list of multimedia element shown as background strip. Thus, while a rotator is rotating, the multimedia elements of the rotator is constantly being modified, and the modification of the multimedia elements takes place on the back side without being seen by the user. This increases the number of multimedia elements a two-sided rotator can show, thus decreasing the probability of any multimedia element landing in the front and at the same time adding variety to the game. The disclosed slot wagering game device utilizes a random number generated within the game to decide which side of the rotator will land on the front.

Figure 1B:
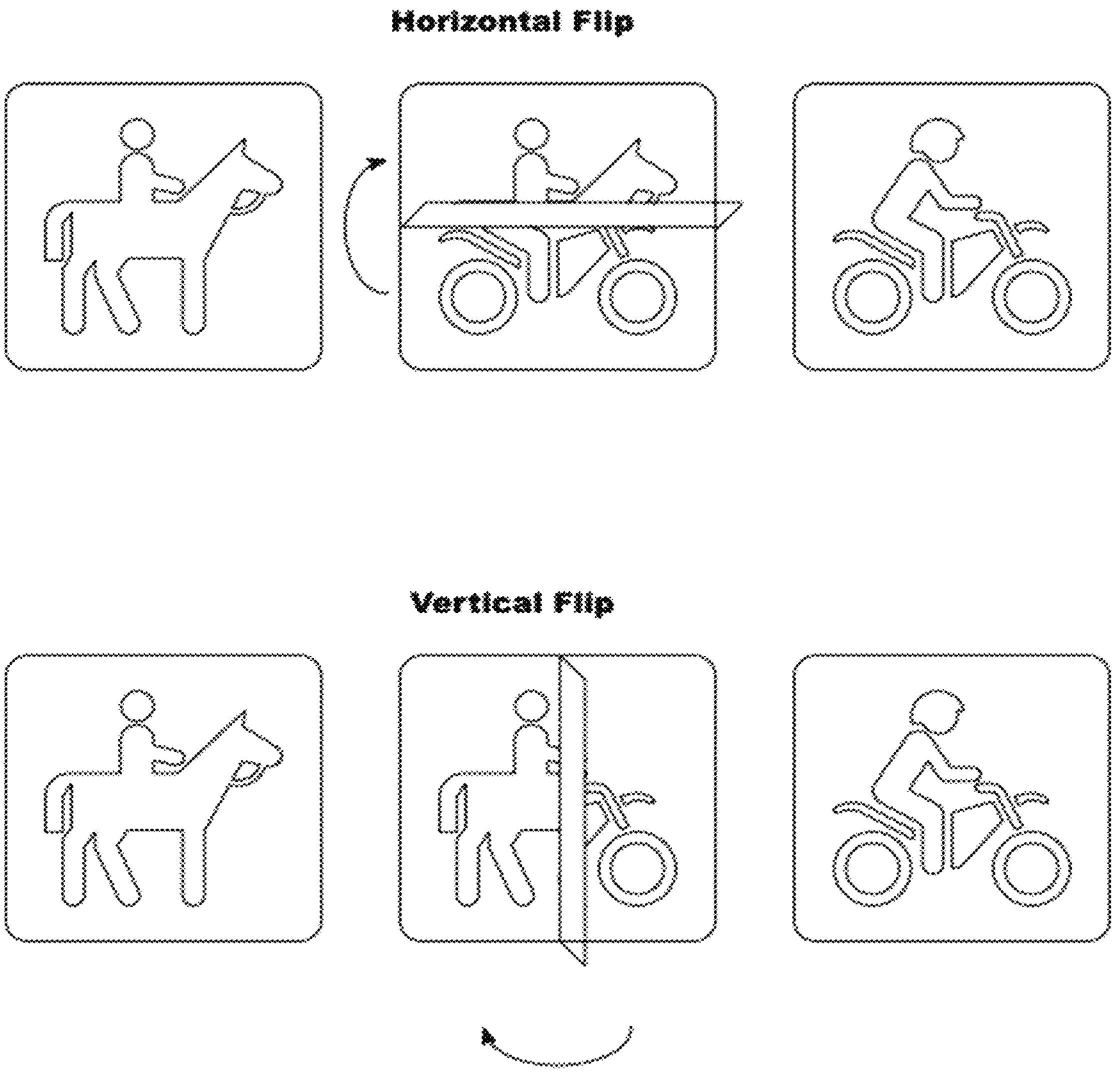
FIG. 1B illustrates different flip orientations of the two-sided rotator shown in FIG. 1A.

FIG. 1B illustrates the rotation types of the two-sided rotator illustrated in FIG. 1A. In one embodiment, the rotating effect is displayed by showing a list of multimedia elements, one following another, from top to bottom, bottom to top, right to left, or left to right, like a scroll. In another embodiment, the rotating effect includes utilizing multimedia transition effects such as Vertical Flip, Horizontal Flip, Fade In, Fade Out, Blinds, etc. In the illustrations within FIG. 1B, a vertical flip and a horizontal flip transition effects are shown. These transition effects are accomplished by using 3D Engines.

Figure 2A:
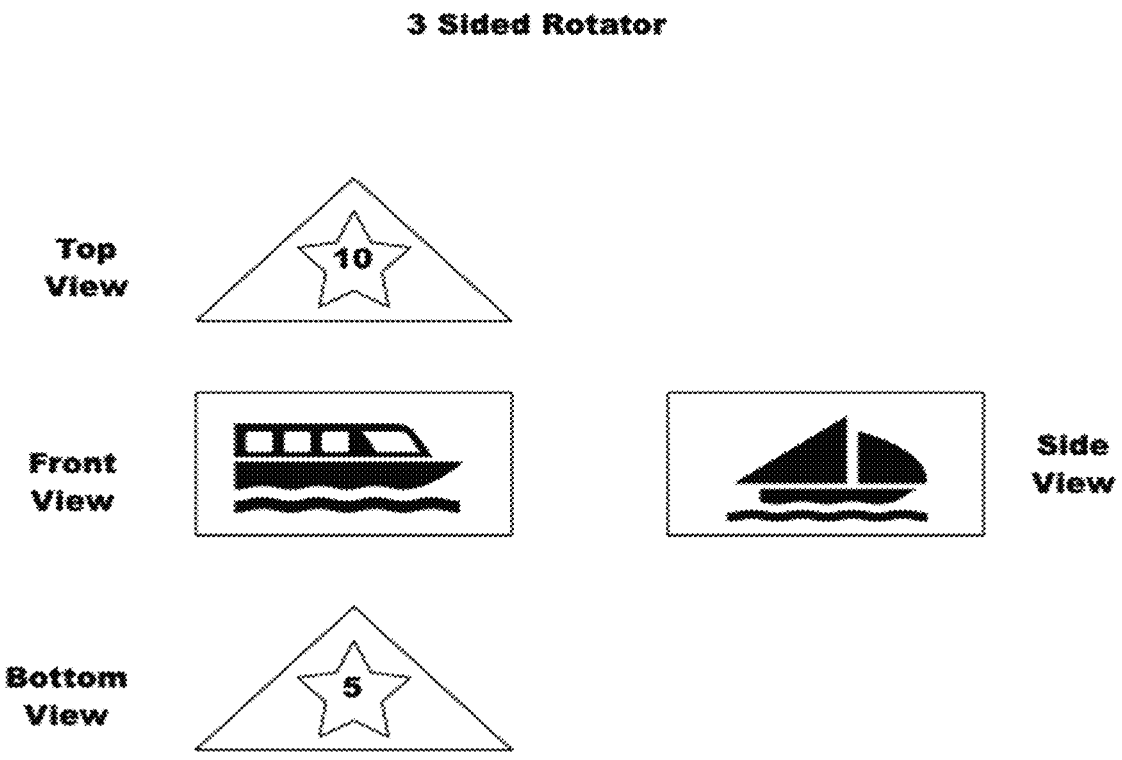
FIG. 2A illustrates a three-sided rotator with a front view, a side view, a top view, and a bottom view.

Referring to FIG. 2A, a three-sided rotator is shown with Front, Side, Top and Bottom view. The three-sided rotator rotates horizontally causing the front view and the side view to display two sides of the three-sided rotator, and with a third side of the rotator always hidden, and a background strip of multimedia elements can be utilized to change the multimedia element associated with the third side (i.e. the hidden side) during rotation of the rotator, thereby increasing the number of multimedia elements for the rotator to show. It is noted that the top view and bottom view both show a triangular shape to simulate a three-dimensional three-sided rotator.

Figure 2B:
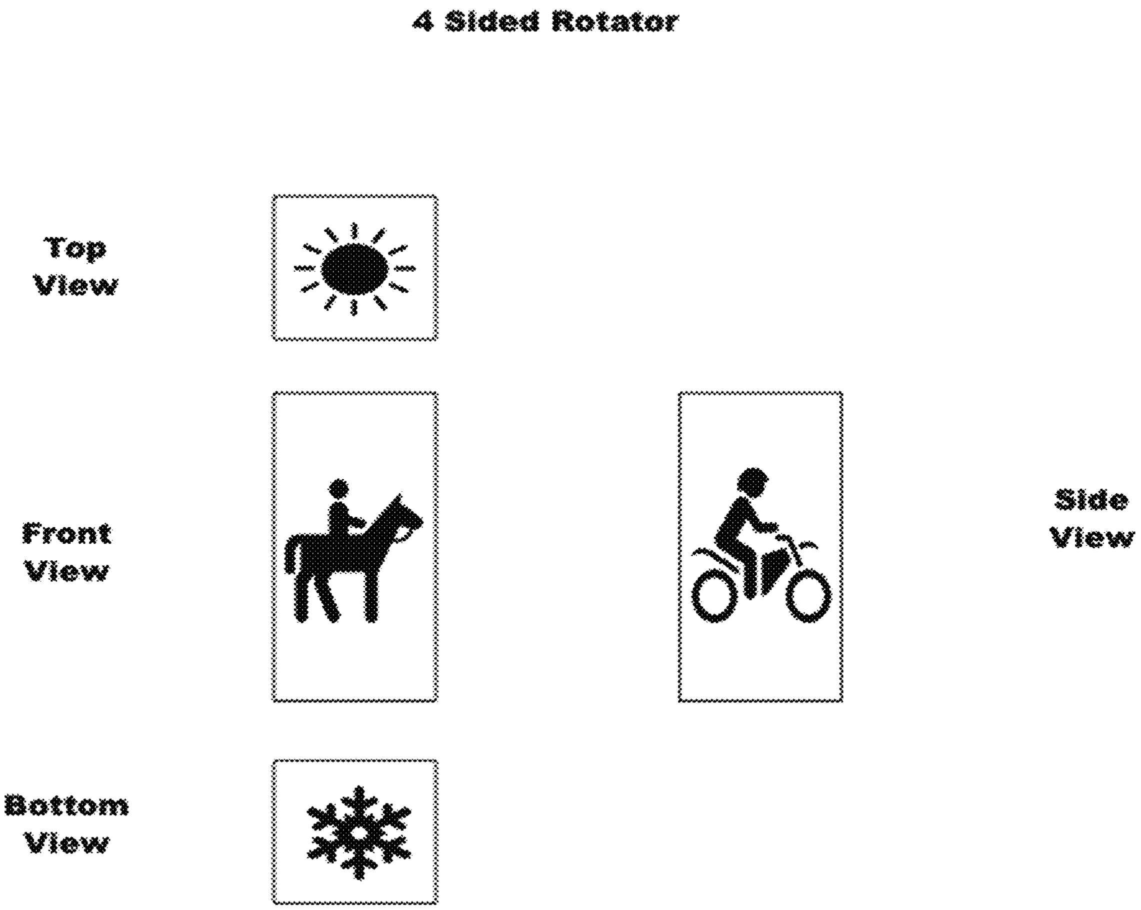
FIG. 2B illustrates a four-sided rotator with a front view, a side view, a top view, and a bottom view.

Referring to FIG. 2B, a four-sided rotator is shown with Front, Side, Top and Bottom view. Similarly, the four-sided rotator rotates horizontally causing the front view and the side view to display two sides of the four-sided rotator, and with the other two sides of the rotator always hidden, and a background strip of multimedia elements can be utilized to change the multimedia element associated with the hidden sides during rotation of the rotator, thereby increasing the number of multimedia elements for the rotator to show. It is noted that the top view and bottom view both show a square shape to simulate a three-dimensional four-sided rotator.

Figure 2C:
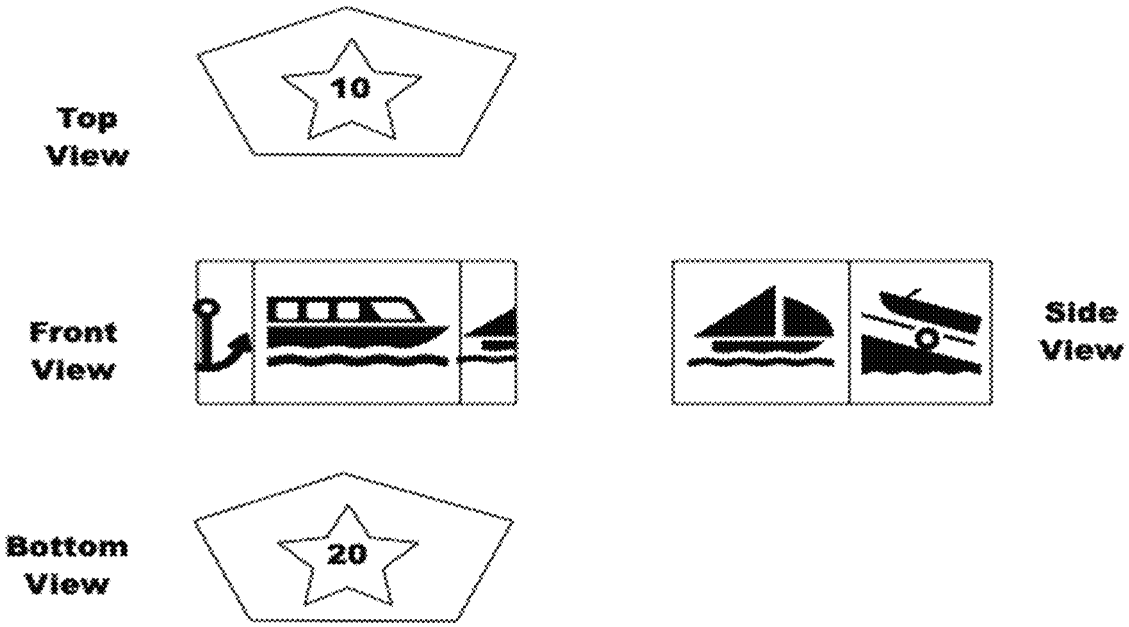
FIG. 2C illustrates a five-sided rotator with a front view, a side view, a top view, and a bottom view.

Referring to FIG. 2C, a five-sided rotator is shown with Front, Side, Top and Bottom view. Similar to the three-sided rotator and the four-sided rotator, the five-sided rotator rotates horizontally causing the front view and the side view to each display at least one side of the five-sided rotator, and with one side of the rotator always hidden. A background strip of multimedia elements can be utilized to change the multimedia element associated with the at least one hidden side during rotation of the rotator, thereby increasing the number of multimedia elements for the rotator to show. It is noted that the top view and bottom view both show a pentagon shape to simulate a three-dimensional five-sided rotator.

Figure 3:
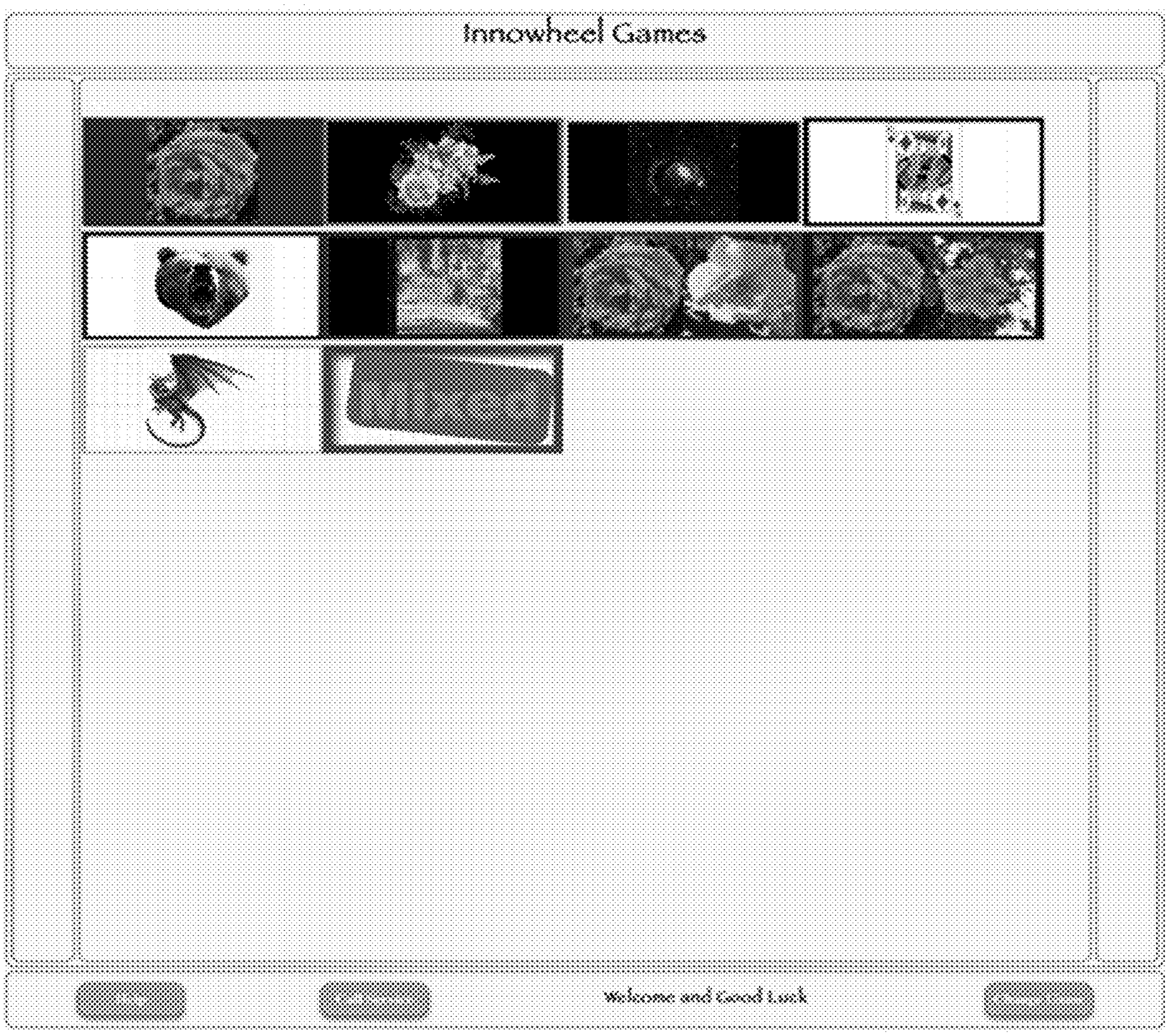
FIG. 3 illustrates a game menu of the instant invention.

Referring to FIG. 3, the game menu is shown. Multiple games can be represented in the menu and a user/player can choose a game he/she is interested in playing. In one embodiment, the game menu is shown in a stack. In another embodiment, the games within the game menu are arranged into groups to provide easier selections to the users.

Figure 4A:
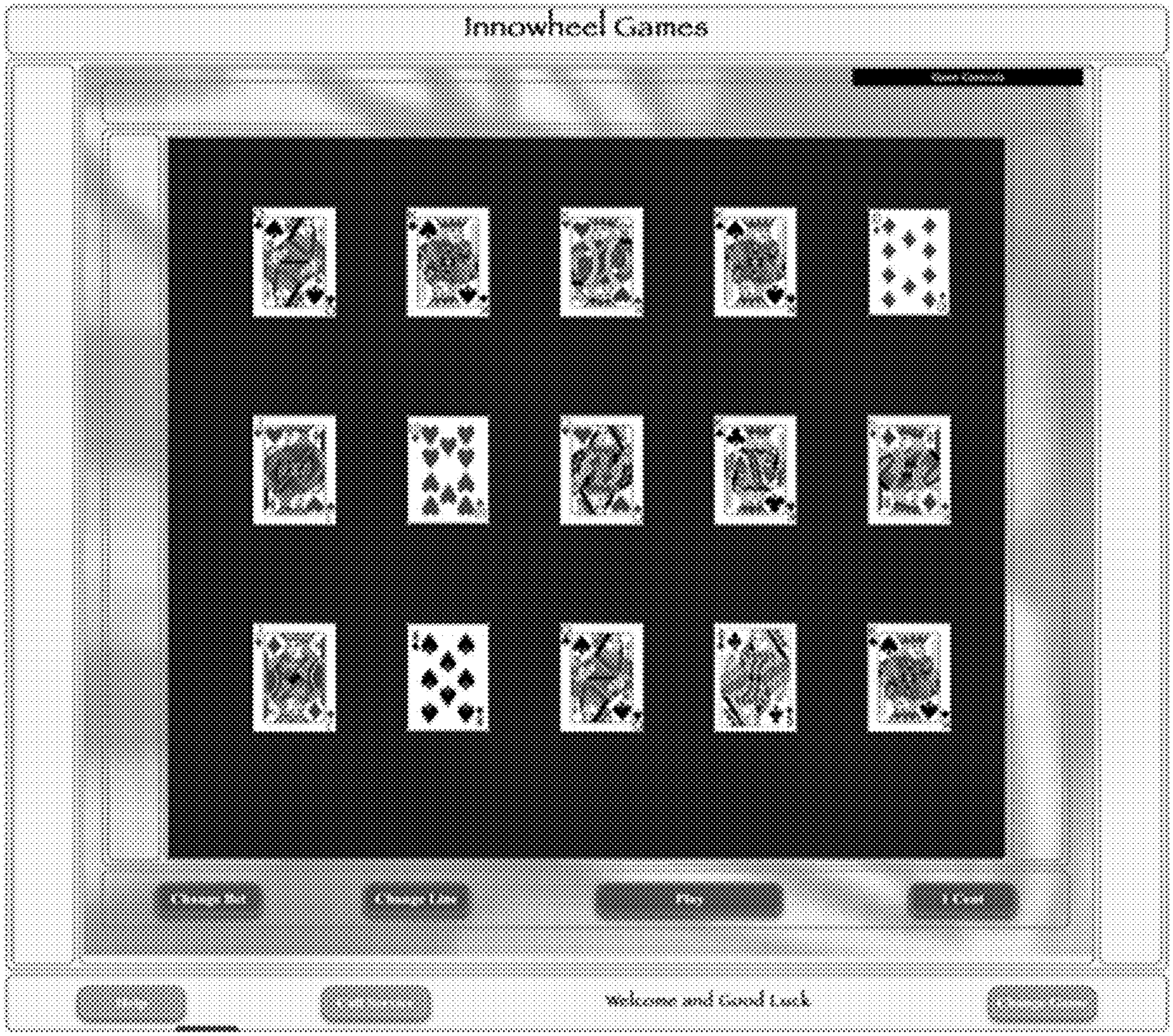
FIG. 4A illustrates a slot wagering game having 4-sided rotators arranged in a 5×3 matrix.
Figure 4B:
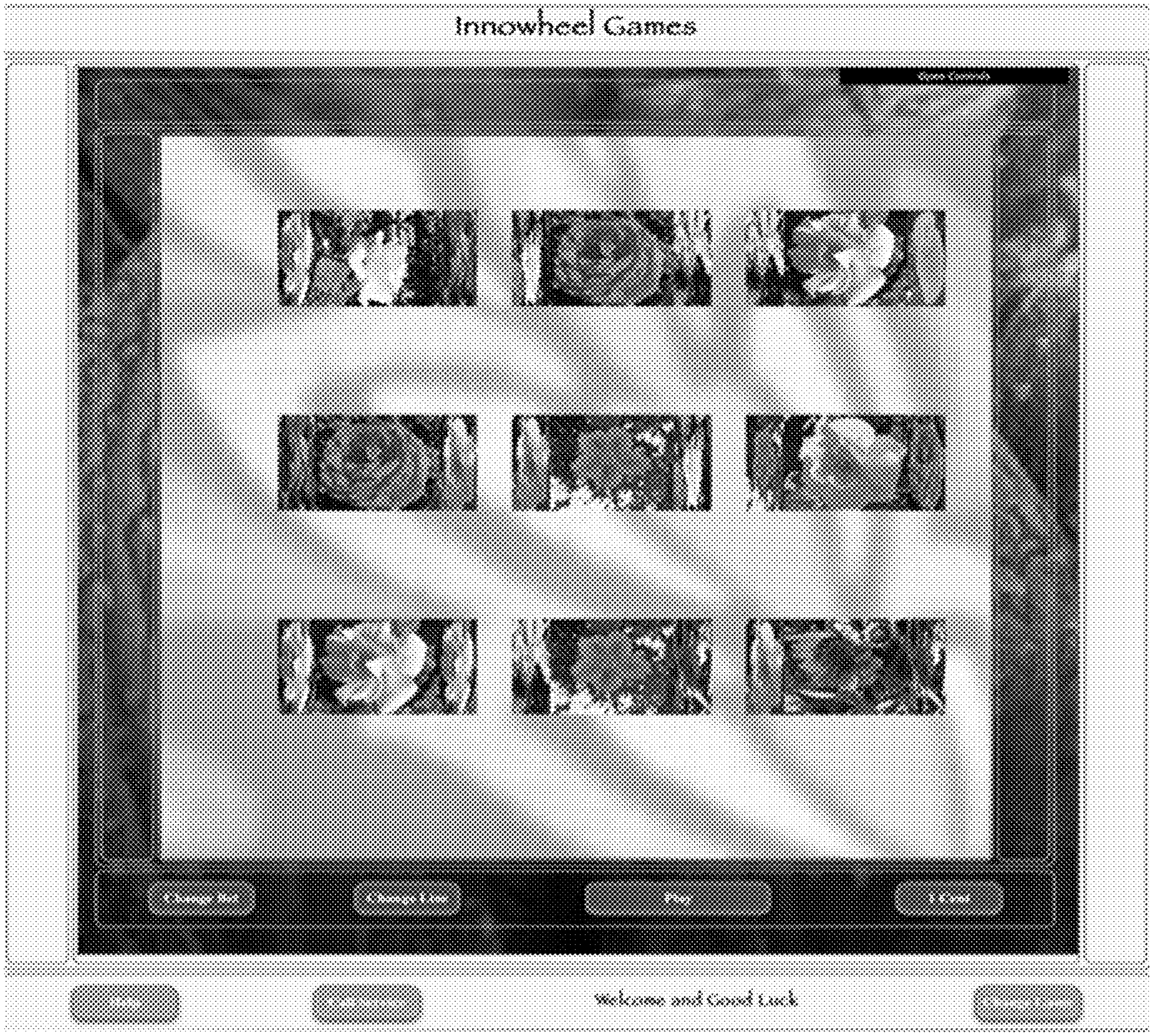
FIG. 4B illustrates a slot wagering game having 5-sided rotators arranged in a 5×3 matrix.
Figure 5A:
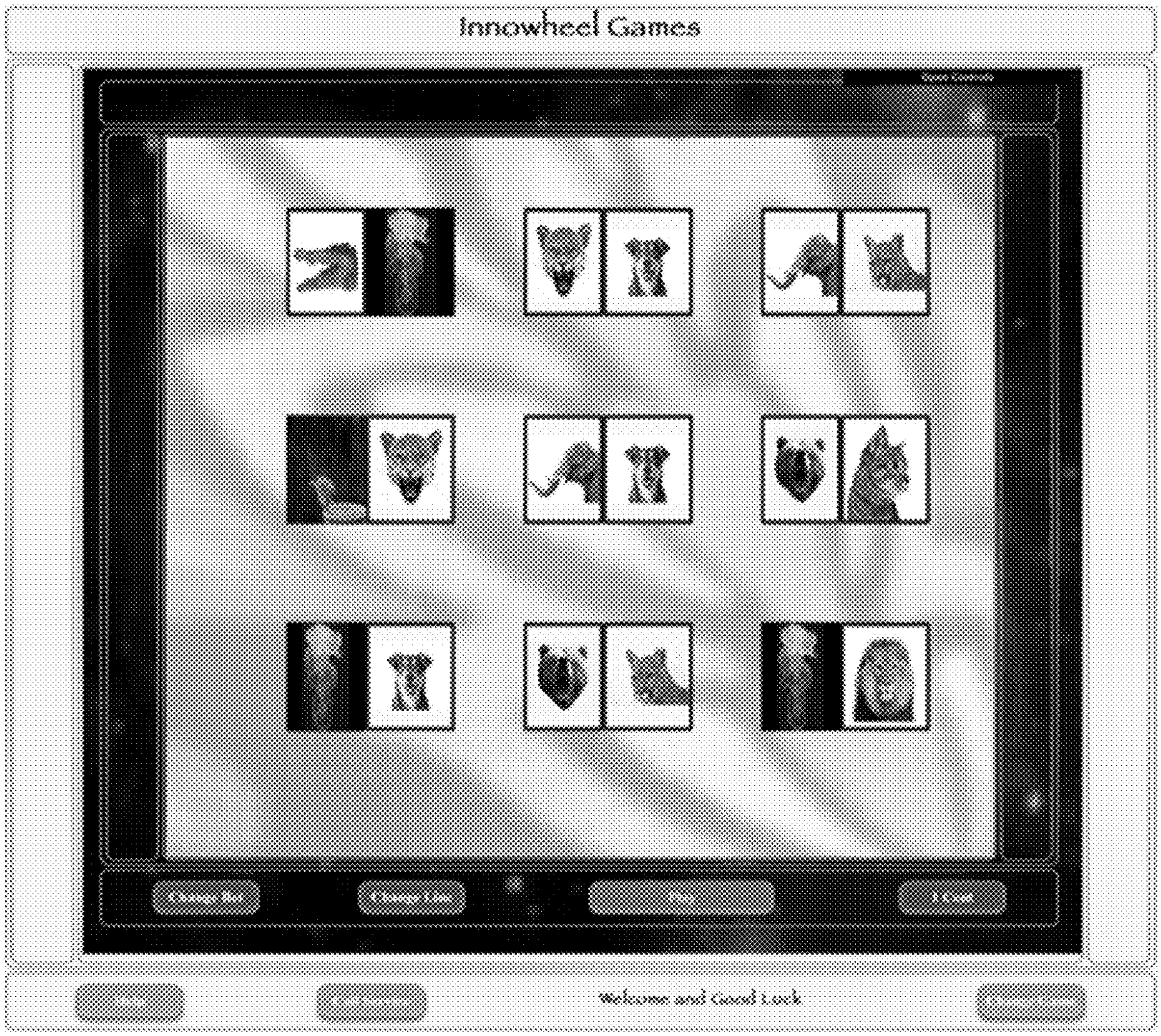
FIG. 5A illustrates a gameplay screen of a game having 4-sided rotators rotating in a horizontal direction arranged in a 3×3 matrix.
Figure 5B:
FIG. 5B illustrates a gameplay screen of a game having 4-sided rotators rotating in a vertical direction arranged in a 3×3 matrix.

FIGS. 4A, 4B, 5A, and 5B provide examples of a gameplay with rotators having different number of sides and with different rotation types. In specific, FIG. 4A illustrates a slot wagering gameplay having 4-sided rotators arranged in a 5×3 matrix, and FIG. 4B illustrates another slot wagering gameplay having 5-sided rotators arranged in a 5×3 matrix. FIG. 5A illustrates a gameplay screen of a game having 4-sided rotators rotating in a horizontal direction arranged in a 3×3 matrix. As shown in FIG. 5A, multimedia elements showing animals are framed. This game also shows two different videos: a bird video and a blue jelly fish video, and the videos are played while the rotators are rotating. Alternatively, the multimedia elements can be an animation or in a graphics interchange format (GIF). FIG. 5B illustrates a gameplay screen of a game having 4-sided rotators rotating in a vertical direction arranged in a 3×3 matrix.

Figure 5C:
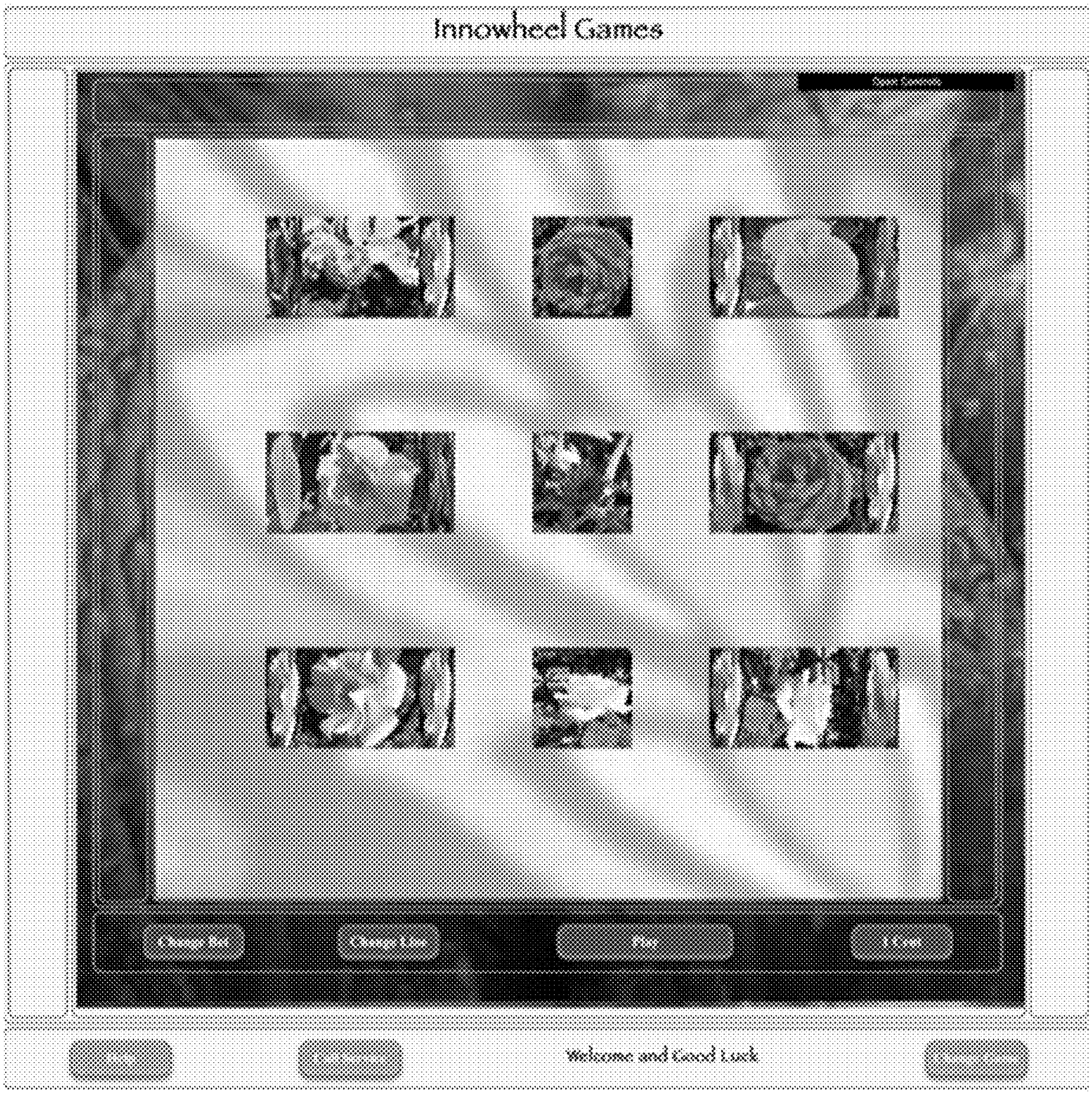
FIG. 5C illustrates a feature of the game where different types of rotators are shown in a single game.

FIG. 5C illustrates a feature of the game where different types of rotators are shown in a single game. As shown in FIG. 5C, the game consists of 5-sided rotators except in the middle column. The middle column consists of 4 sided rotators, which allows the game to be played with different types of rotators. In one embodiment, rotators with vertical and horizontal rotations can be mixed in the game.

Figure 5D:
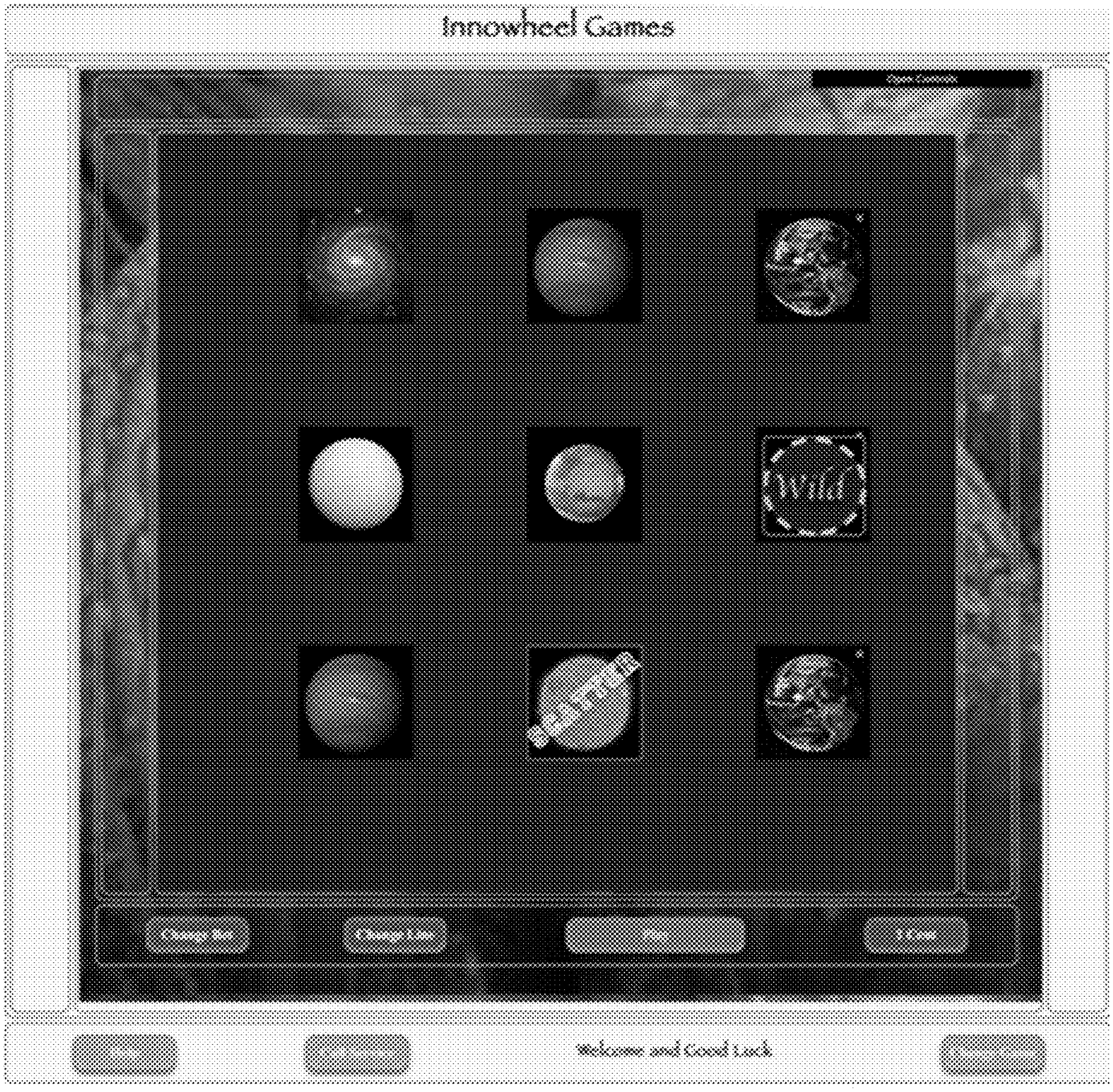
FIG. 5D illustrates a wild feature and a scatter feature of the game.

FIG. 5D illustrates a wild feature and a scatter feature of the game. When wilds appear, they can be substituted for any symbol and in so doing if the bet line or bet box amounts to a win, an award will be given to the player. On the other hand, scatter is an independent award image. If a scatter appears, it simply gives certain award to the player. It need not be part of bet line or bet box.

Figure 5E:
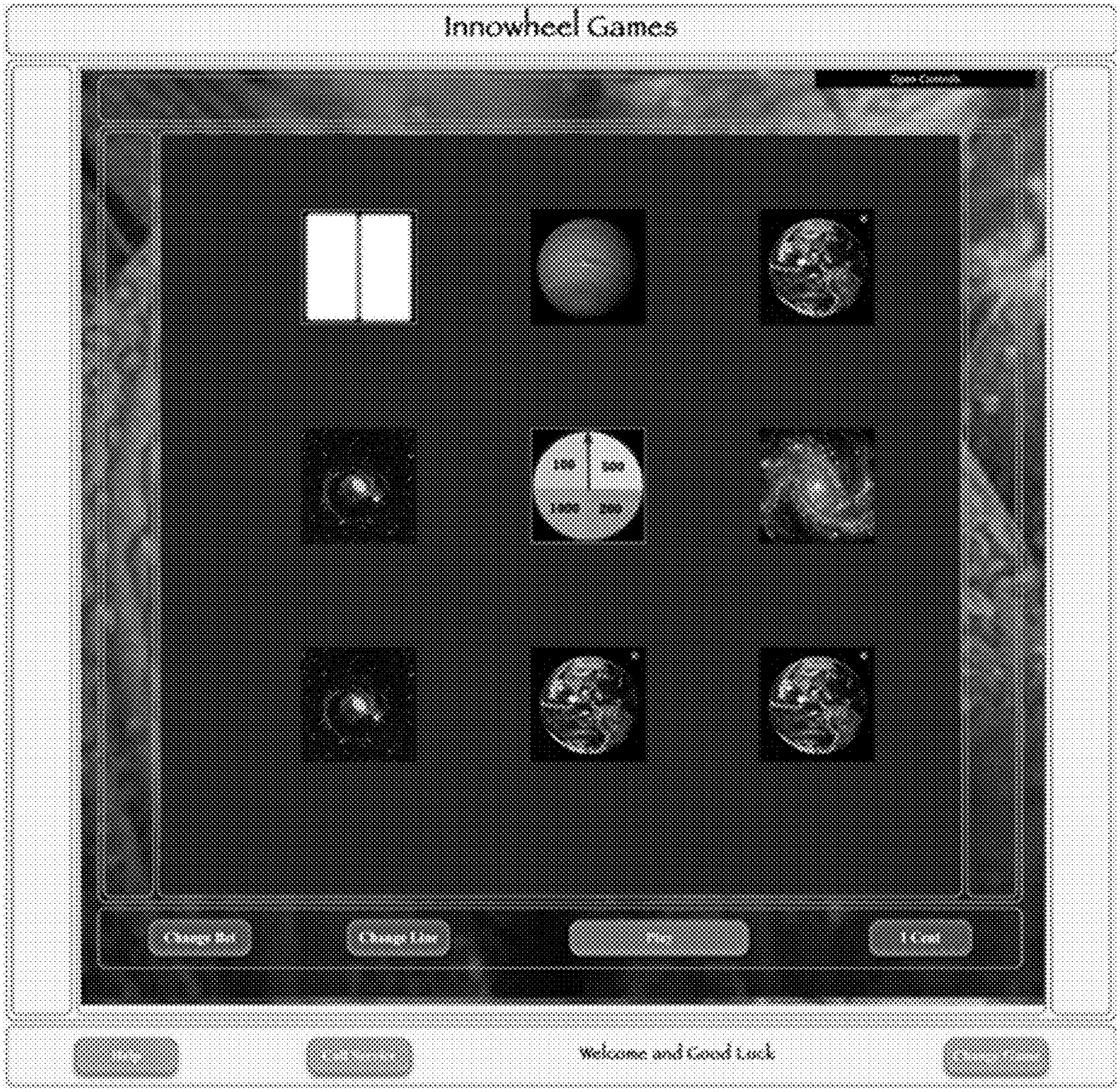
FIG. 5E illustrates a blank feature and a wheel feature of the game.

FIG. 5E illustrates a blank feature and a wheel feature of the game. Regarding to the blank feature, when a blank appears, the player can touch the rotator and an image will be revealed. If the revealed image is part of the bet line or bet box, it can lead to an award as per rules of the games. FIG. 5E further illustrates the wheel feature. The wheel feature can be used in three different ways: (1) when a wheel appears on the screen, it behaves like a scatter symbol. That is, it is independent of bet lines and bet boxes. In that case, it can spin and land in a value and award that value, (2) if a wheel appears on a bet line or bet box it can be wild and if it substitutes as an image and results in an award, it can spin and give the value as an award or provide additional value to the award, or (3) the wheel can also be used as multiplier (2×, 3×, 4× etc.). If the wheel appears as part of a bet line or a bet box, it can be substituted as wild and resulting award can be multiplied based on the spin and then awarded.

In one embodiment, the spin of the wheel can be automatically occurred, and in another embodiment, the player can touch the wheel to start the spin. In one embodiment, more than one wheel image can occur in a screen at the same time.

Figure 5F:
FIG. 5F illustrates a game with different types of rotators.

FIG. 5F illustrates a game with different types of rotators. As shown in FIG. 5F, the middle rotator is rotated in different direction to show the bottom view. Top or bottom view can have different awards and a rotator can rotate in different direction after completing all spins and then reveal the award.

Figure 6A:
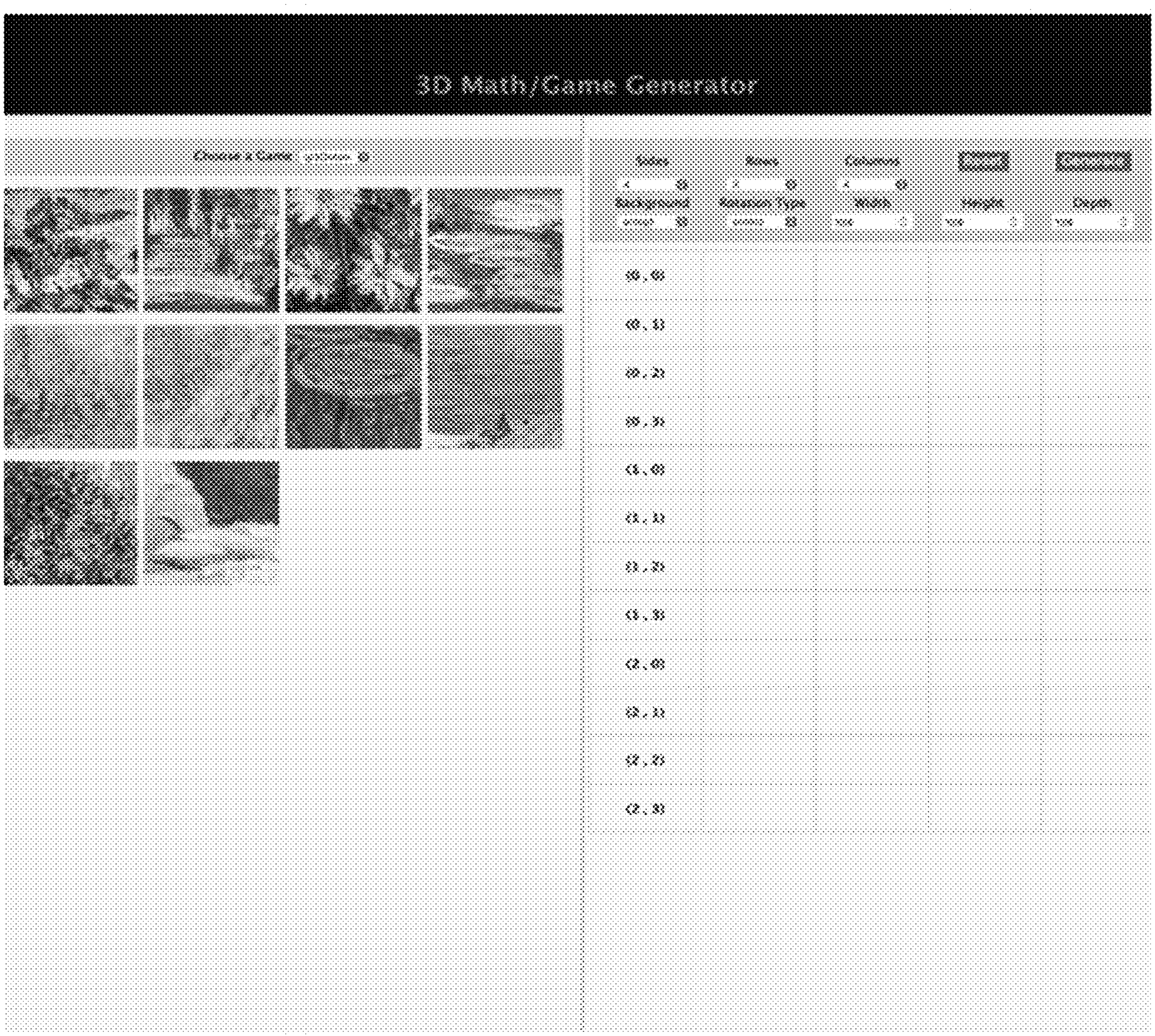
FIG. 6A illustrates a game and math generator graphic user interface before creating a game.

Referring to FIG. 6A, a Game and Math Generator (i.e. game generating user interface) is shown before creating the rotator images. The screen on the left shows the images that are available to make the rotators. These images can be artist drawn, Photographs, Videos, Animations, etc., and can be imported/uploaded by the user via the game device. The Game and Math Generator further illustrates dropdown menus or text boxes configured to receive the user's input for parameters such as number of sides, game matrix rows, game matrix columns, background, rotation type (e.g. clockwise, counterclockwise, vertical, or horizontal), width, height, and depth. These fields are filled with default values and can receive the user's customization for one or more parameters. Each rotator can be assigned with different parameters. For example, one rotator can rotate clockwise while another rotator rotates counterclockwise in the same game. In one embodiment, the game generating graphic user interface further enables the user to include additional parameters comprising sound features and new game features.

In one embodiment, instead of having multi-sided rotators, each rotator can be either 2D or 3D representation of cylinders, cones, or polyhedranes. For example, one rotator can be presented as a 2D cylinder while another rotator is displayed as a 3D polyhedranes in the same game. Furthermore, one rotator can be set to trigger another rotator to rotate. For example, when a 2D cylinder (or 2D like reel) rotator stops at a predetermined position, it can trigger a 3D rotator to rotate.

In one embodiment, the input parameters further include camera type, field of vision, light type such as direct light or other lighting that will be displayed.

In one embodiment, each background image is associated with a probability of a multimedia element landing in the front view. Therefore, the user can choose a background representing a desired difficulty of the game. The background can be static or dynamic. In another embodiment, the background can be set to dynamic and allow the user to set a moving direction or pattern of a background image or upload a video to be displayed as the background.

Figure 6B:
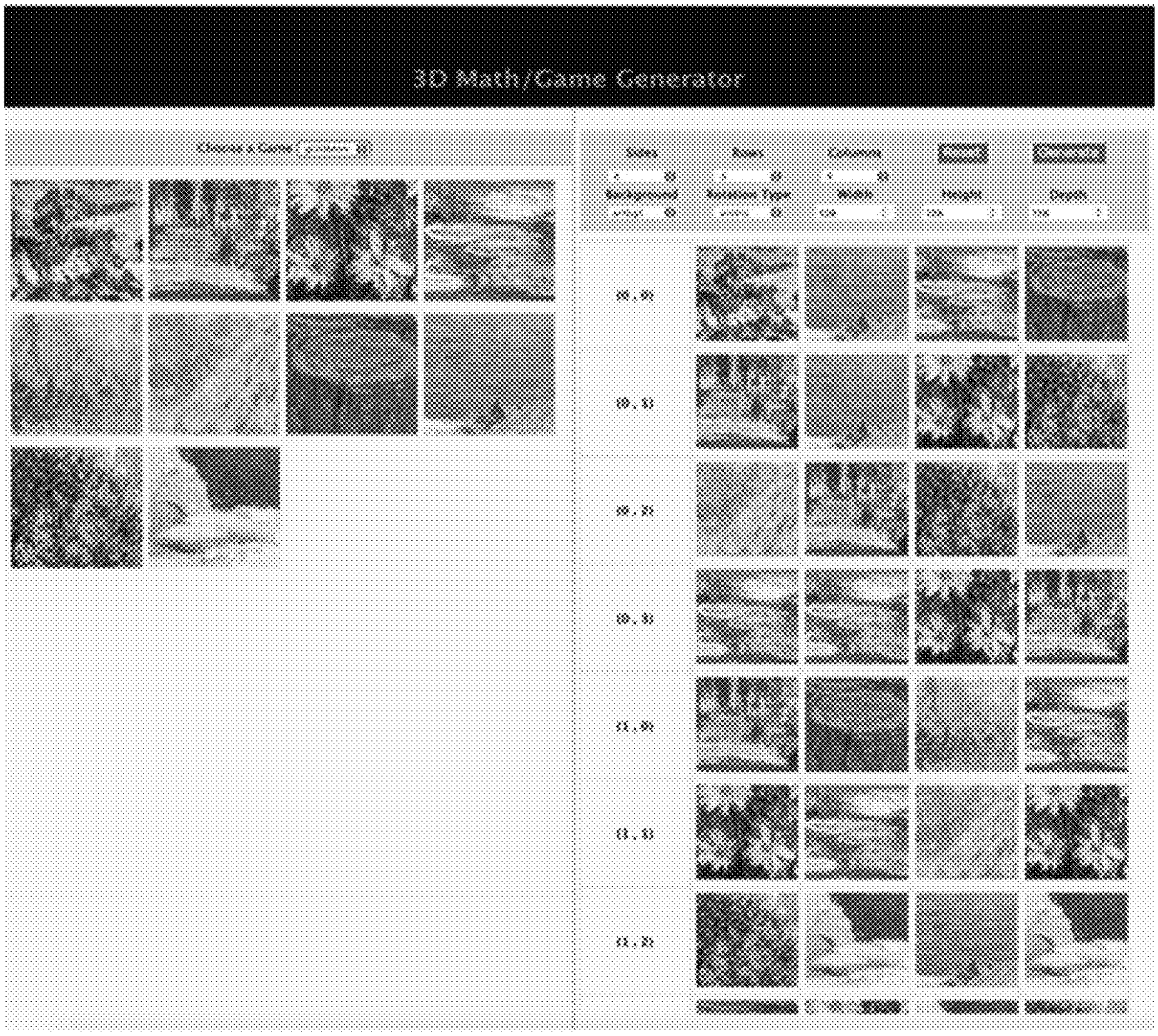
FIG. 6B illustrates the game and math generator graphic user interface illustrated in FIG. 6A after creating a game.

Referring to FIG. 6B, the Game and Math generator is shown with multimedia elements on the left and the parameters are selected to require four-sided rotators in 3×4 matrix, the Background is selected as 'ArtBg1', the rotation type is selected as counterclockwise in horizontal direction, and the width, the height and the depth of the rotator are set to 128 each. The Game and Math generator further illustrates a generate button configured to populate the multimedia elements onto the customized rotators.

When the generate button is clicked by the user, a math file, an icon, and a rotator file are generated. The files generated will be used by the game to display a new game in the menu and player can choose the game and start playing.

The Game and Math generator further includes a reset button configured to remove the generated game and math. The reset button can be used to create a new game by resetting the previously entered parameters back to default values and removing the populated multimedia elements from the rotators.

Figure 6C:
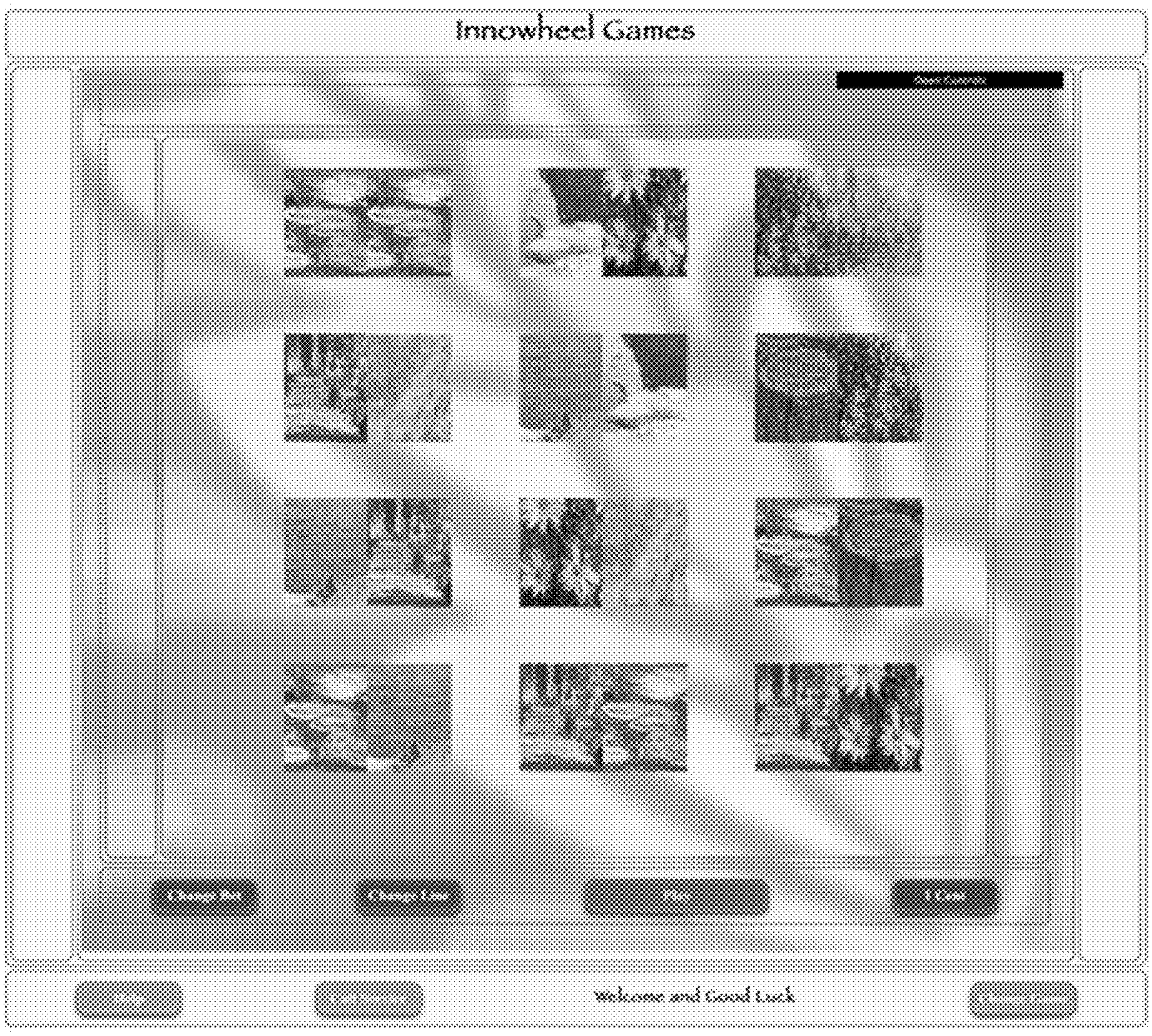
FIG. 6C illustrates a gameplay for the game created in FIG. 6B.

FIG. 6C illustrates a gameplay for the game created in FIG. 6B. The gaming screen includes a change bet button configured to receive a new betting value from the user and a change line button configured to receive a modification of a betting line from the user. As shown in FIG. 6C, the gaming screen further displays a current betting value, and the play button to issue a rotating commend.

Figure 6D:
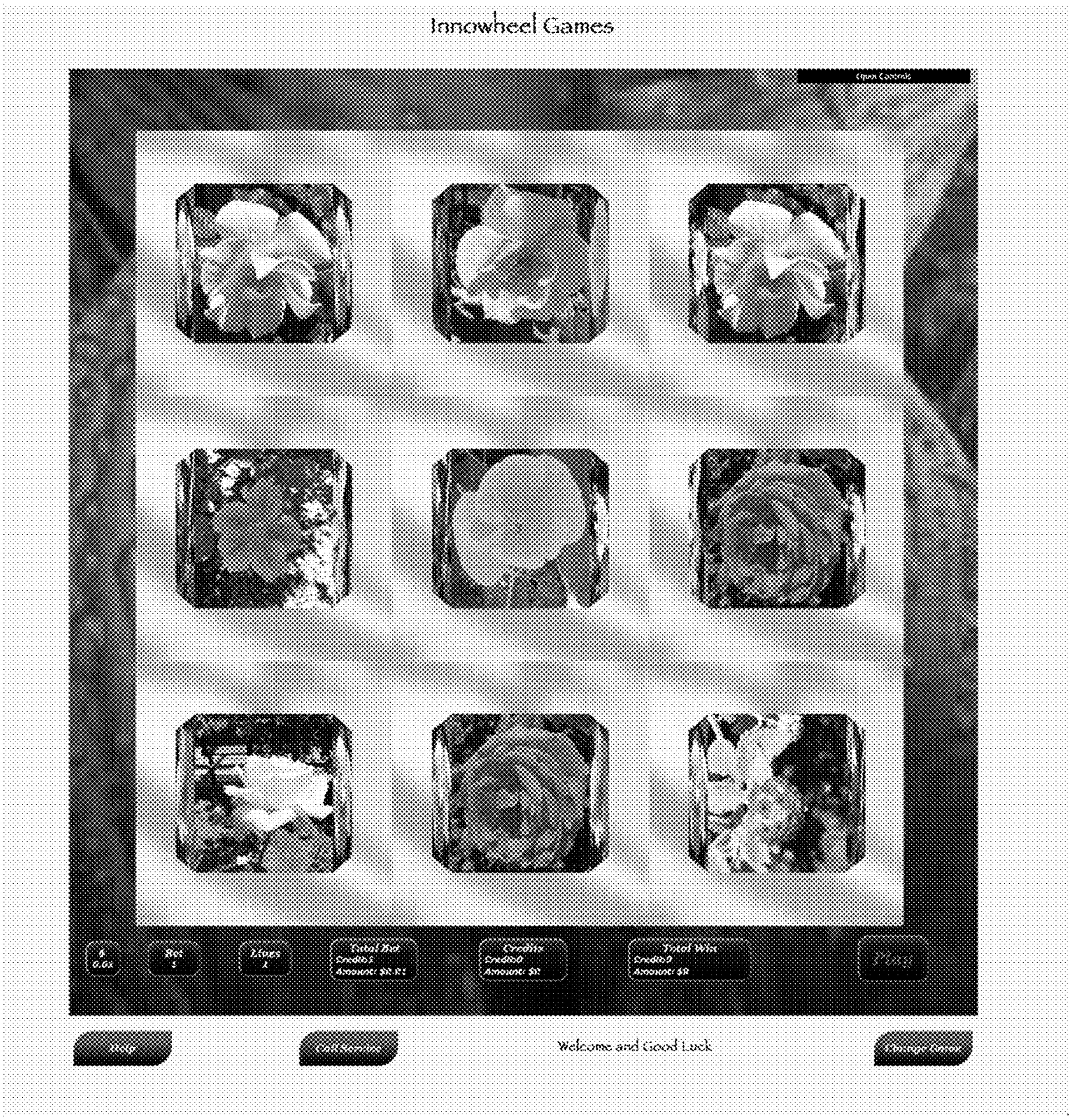
FIG. 6D illustrates a gameplay screen of a game having 5-sided rotators with betting information displayed.
Figure 6E:
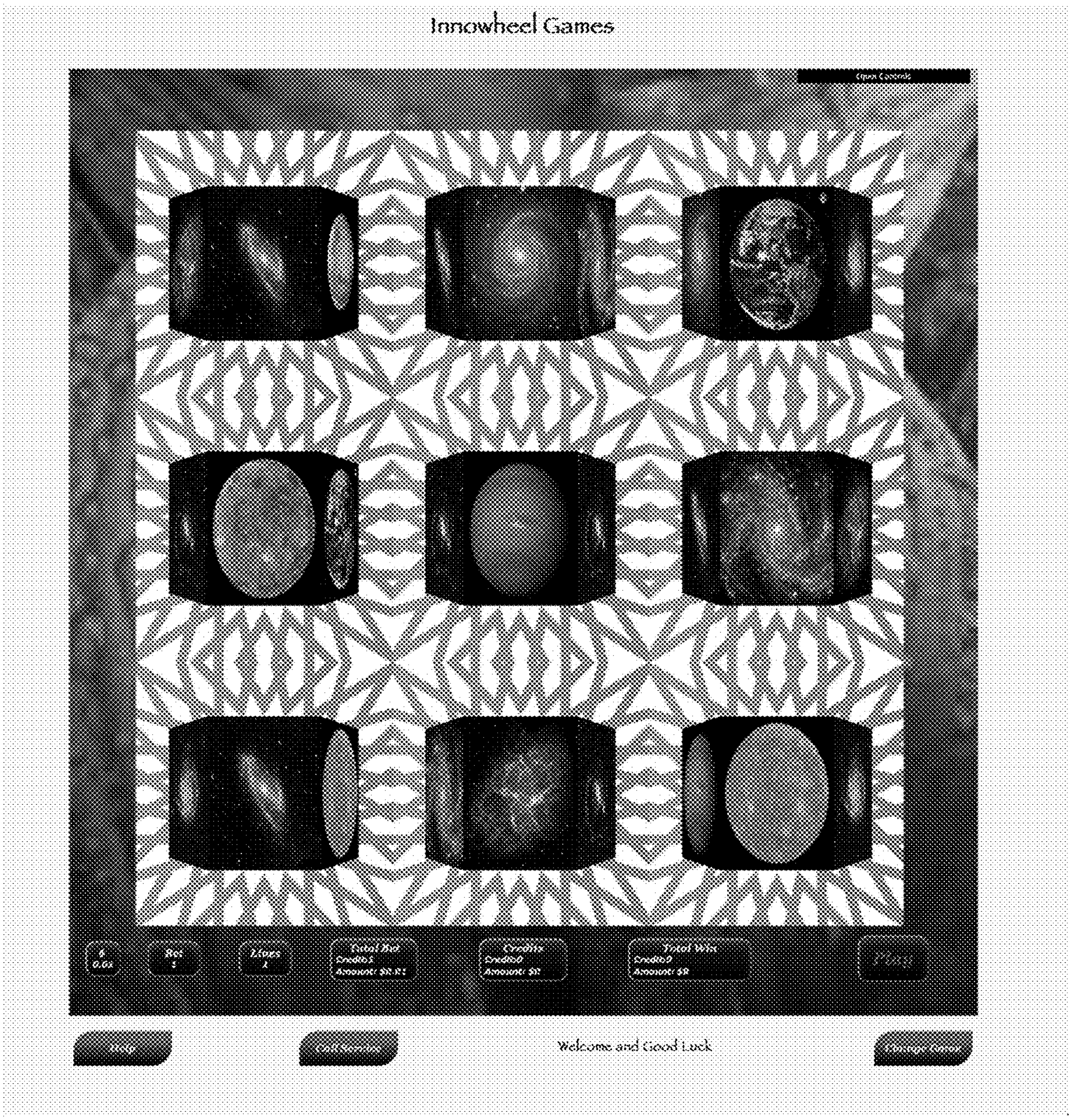
FIG. 6E illustrates a gameplay screen of a game having 6-sided rotators with betting information displayed.

FIGS. 6D-6E illustrate a gameplay screen of a game having 5-sided rotators and 6-sided rotators, respectively, with betting information displayed. The displayed betting information includes, but is not limited to, current betting amount, bet size, number of bet lines, total bet credit amount, current credit balance, and total number of wins. The "Bet" button displaying the current bet size can be clicked by the user to change the current bet size. The "Lines" button displaying the current number of bet lines can also be clicked by the user to change the current number of bet lines. The total bet information is then automatically updated based on the current bet amount and the current number of bet lines. A play button is also deployed for triggering by the user to start a betting game with the current bet size and the current number of bet lines and cause the rotators to rotate. When the "change game" button is clicked by the user, the gaming system redirects the user to the Game and Math Generator as shown in FIGS. 6A and 6B for the user to modify both the appearance and the configuration of the game. The "Help" button can be clicked by the user to obtain instructions on how to play the game, and the "Call Service" can be clicked by the user to obtain contact information for problems about the game. The contact information includes, but is not limited to, names, emails, phone numbers, and addresses.

Figure 6F:
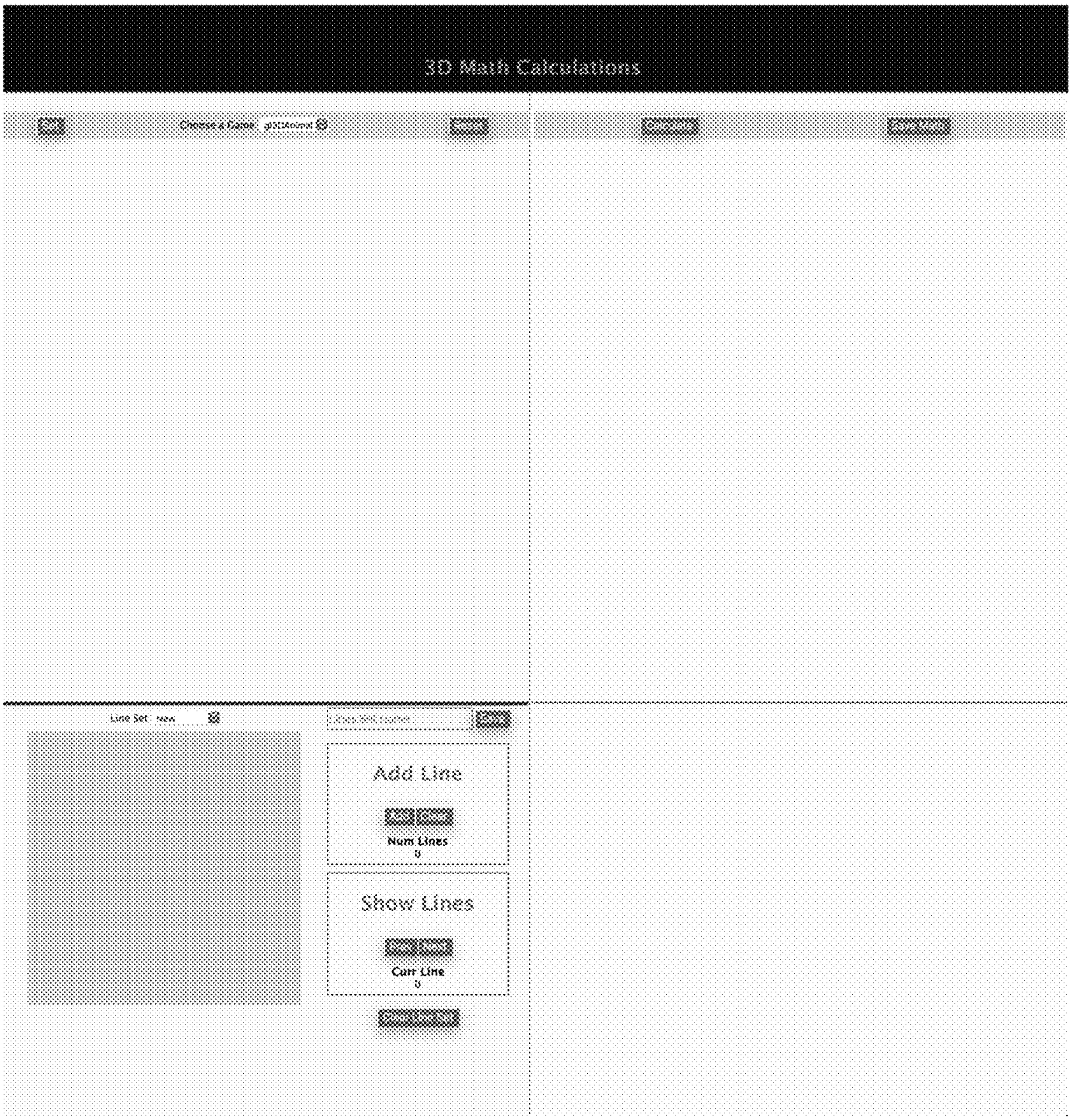
FIG. 6F illustrates a math calculation interface calculating and displaying the math of the game.

FIG. 6F illustrates a math calculation screen for calculating and displaying the math of the game.

The pay value section (i.e. the top left section) displays the images used in the game along with associated pay values. The pay values can be set and reset by the user. The pay value section includes a scroller allowing the user to scroll up and down to view each of the plurality of multimedia elements and to set corresponding pay values for each of the plurality of multimedia elements.

The probability calculation section (i.e. the top right section) allows the user to calculate the probability for each symbol and obtain a selected number of occurrences for the corresponding symbol. The probability calculation section further includes a calculate button and a save math button, wherein the calculate button allows the user to calculate probabilities according to the pay values entered in the pay value section, and the save math button allows the user to store the calculated probabilities into the memory.

The line setting section (i.e. the left bottom section) allows the user to select the lines for the particular game selected in the top left section. Here, a new line set can be added for a game. A line set includes a set of lines, where each line is a set of locations (may be limited to one location per column). A line usually has multiple locations depending on the number of columns, for example, in a 5-column game each line contains 5 locations; The locations need not form a straight line. If a game symbol arrives in these locations of the line, it is a winning symbol. Depending on the setting, a price can be awarded to a same winning symbol appears in 2 or more locations of a line. The price won depends on the number of line, prize set, and/or the number of locations on the line the symbol showed up after the spin. The line setting section further comprises a line set name field, a line name field, a add line button, a clear line button, a show line button, a reset button, and a clear line set button, wherein the line set name field allows the user to name the line set, the line name field allows the user to name a line, the add line button allows the user to add a line to the line set, the clear line button allows the user to remove a line from the line set, the show line button allow the user to trigger a display of a line in a graph indicating locations included in the line, the reset button allows the user to reset the locations included in the line, and the clear line set button allows the user to empty the line set.

The theoretical percentage section (i.e. the bottom right section) displays the win percentage based on the line set, prize amount, and probabilities of different symbols. The theoretical percentage displayed in the theoretical percentage section is calculated based on the pay values in the pay value section, the line set in the line setting section, and the probabilities in the probability calculation section. The math calculation interface shown in FIG. 6F provides detailed probabilities and statistics for the user to generate the game.

Figure 6G:
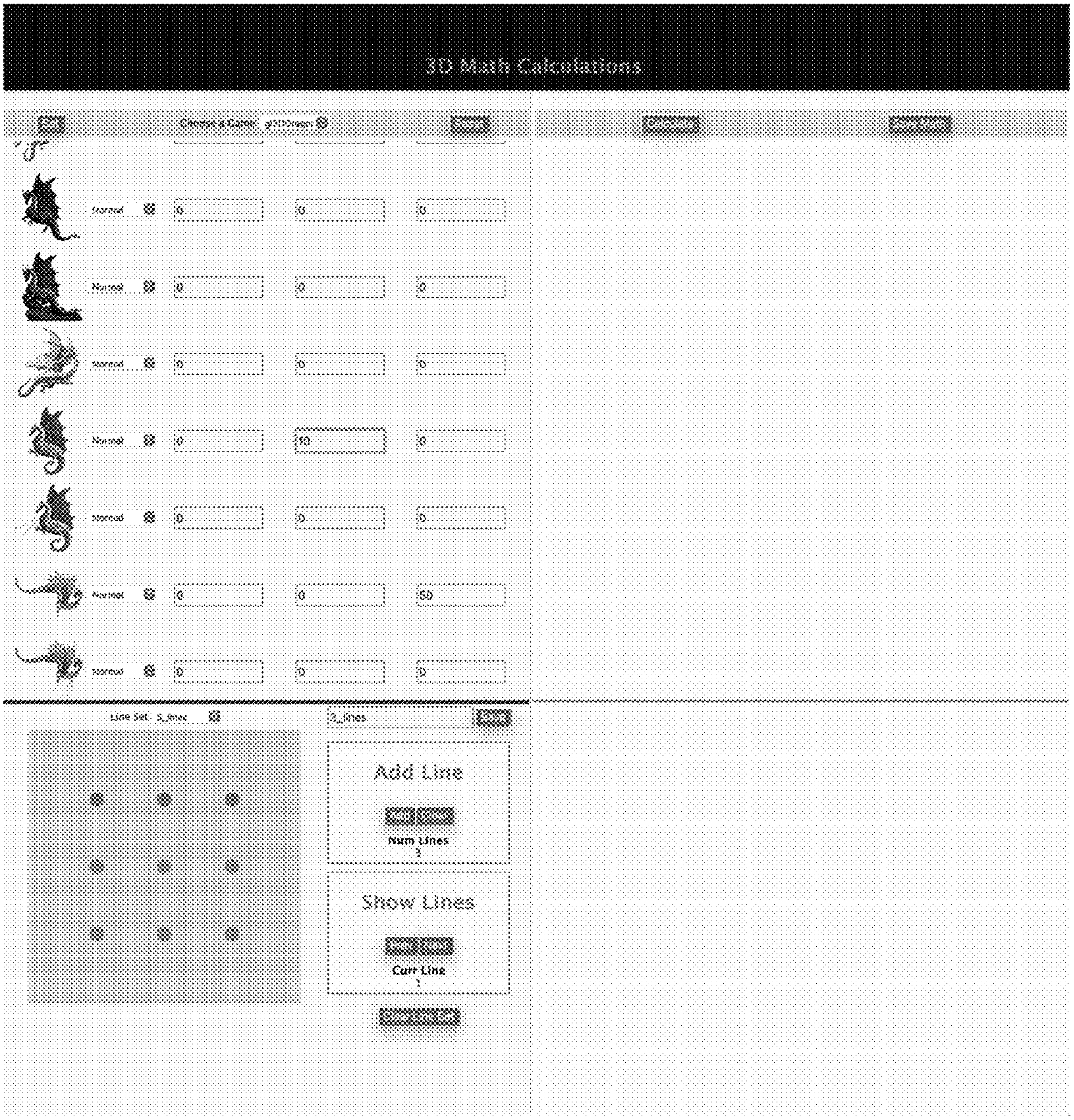
FIGS. 6G and 6H illustrate an exemplary usage of the math calculation interface for calculating and displaying the math of the game.
Figure 6H:
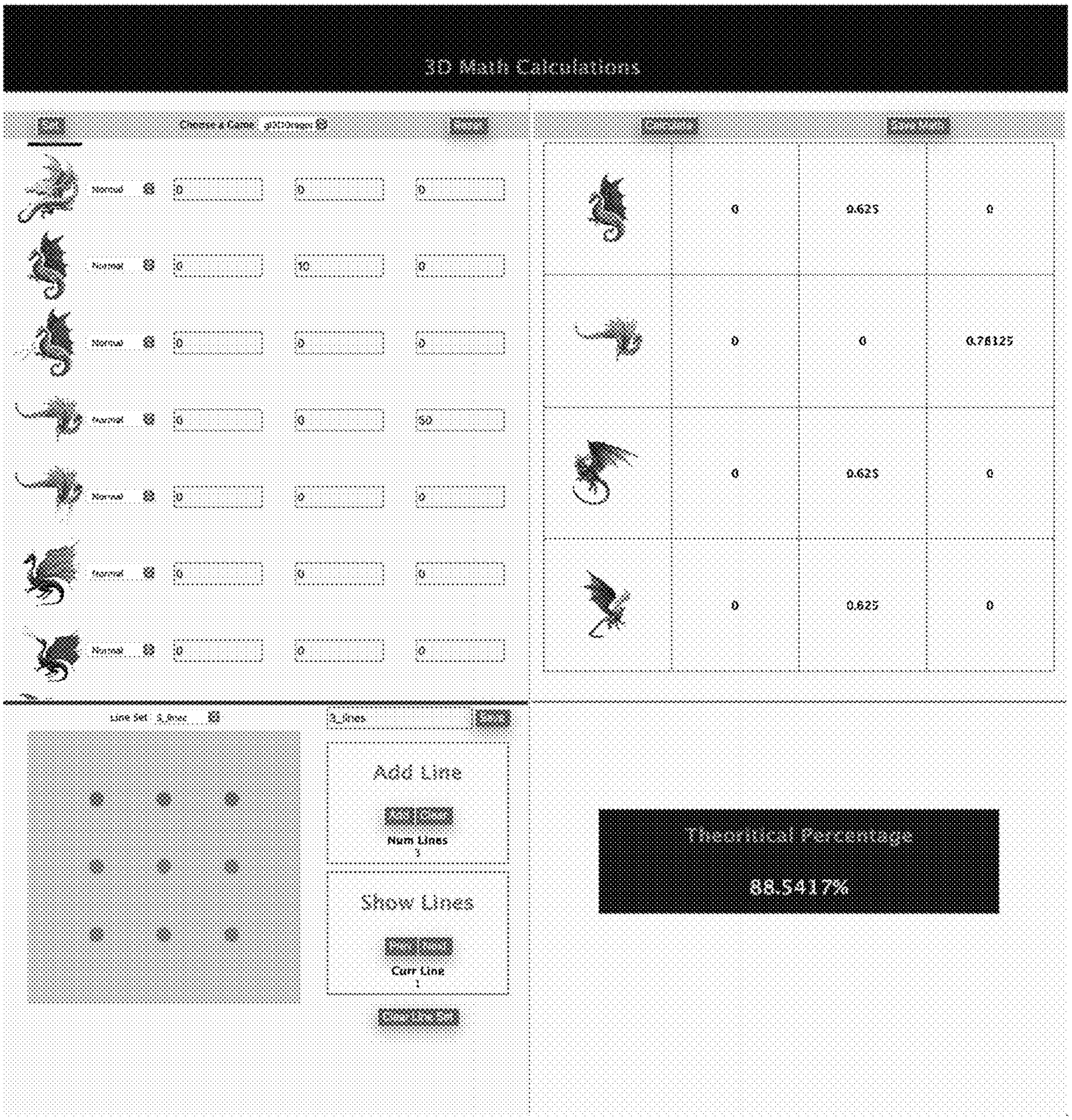

FIGS. 6G and 6H illustrate an exemplary usage of the math calculation interface for calculating and displaying the math of the game. In FIG. 6G, the game has been chosen on the top left section and the corresponding pay values (win amounts in credits) are chosen for two of the symbols. One with 10 credits when 2 of them occur in the line and another with 50 credits when 3 of them occur in the line. The top left section can be scrolled up and down to show other symbols and the corresponding pay values. At the bottom left, the nine dots represent a 3×3 game. Depending on the game, these dots will change. For example, if it is 4 rows by 5 columns game, it will have 4 rows and 5 columns of dots. Here, for this math calculation, a 3-line set is chosen. The green dots show the first line of the 3 lines. By pressing next under show lines, other lines can be seen. The user can also click on the "Add" button to create new line sets and save for future use. This way other 3×3 line games can use the same line sets created for this game.

In FIG. 6H, the top right section displays the probabilities of occurrence of the symbols which have pay values set. This is calculated by pressing calculate button on the right top section. The bottom right section shows the calculated theoretical percentage for the chosen line set and pay values of the symbols. The theoretical percentage presents that given the pay values set, the theoretical percentage of amount received by the game would be paid back to the players. In this example, 88.54% of the credit received by the game would theoretically be paid back to the players by the game.

With the Game and Math Generator as illustrated in FIG. 6A and the math calculation interface shown in FIGS. 6F-6H, the system enables a user to easily design a betting game that satisfies certain desired payback requirements.

Figure 7A:
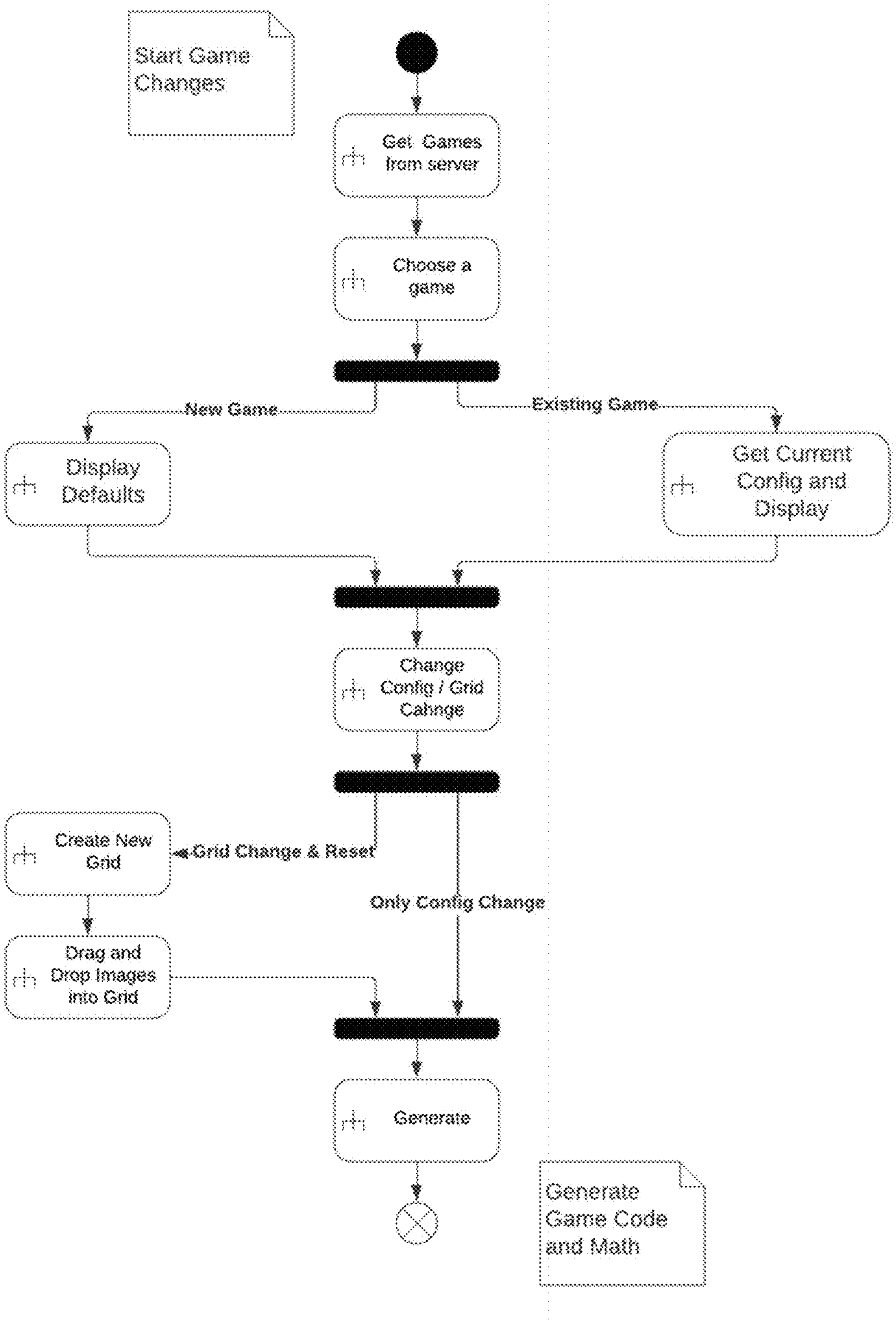
FIG. 7A illustrates a flow chart describing the process performed by the game and math generator illustrated in FIGS. 6A-6B.

FIG. 7A illustrates a flow chart describing the process performed by the game and math generator illustrated in FIGS. 6A-6B. As presented in FIG. 6A, the Game and Math generator graphic user interface shows a game name field on the upper left-hand side. When the user types in a new game name into the game name field, the Game and Math generator enters a new game creation mode and populates all fields on the right hand side of the screen with default values, and when the user types in an existing game name into the game name field, the Game and Math generator loads the corresponding game to the game name and populates all fields on the right hand side of the screen based on parameters of the loaded game.

The Game and Math generator then receives the user's inputs about number of sides, game matrix rows, game matrix columns, background, rotation type (e.g. clockwise, counterclockwise, vertical, or horizontal), width, height, and depth. When the user makes changes to one of the fields regarding the number of sides, the game matrix rows, or the game matrix columns, the Game and Math generator modifies the number of grids shown on the right-hand side of the screen and repopulates the multimedia elements into the grids. When the user does not make changes to the number of sides, game matrix rows, and game matrix columns, but makes changes to the background, the rotation type, the width, the height, and the depth, the Game and Math generator records the user's changes without repopulating the grids.

Once the grids are formed, the images can be dragged from left side onto the grid on to right hand side. If image already exists, it can be deleted, and new image can be added. Other parameters such as background, length, width, etc. can be changed before generating the game and math. Once generated, the game would be stored in specific directories with an icon/logo inputted by the user, and the game will automatically show in the selection/lobby screen and run automatically.

Figure 7B:
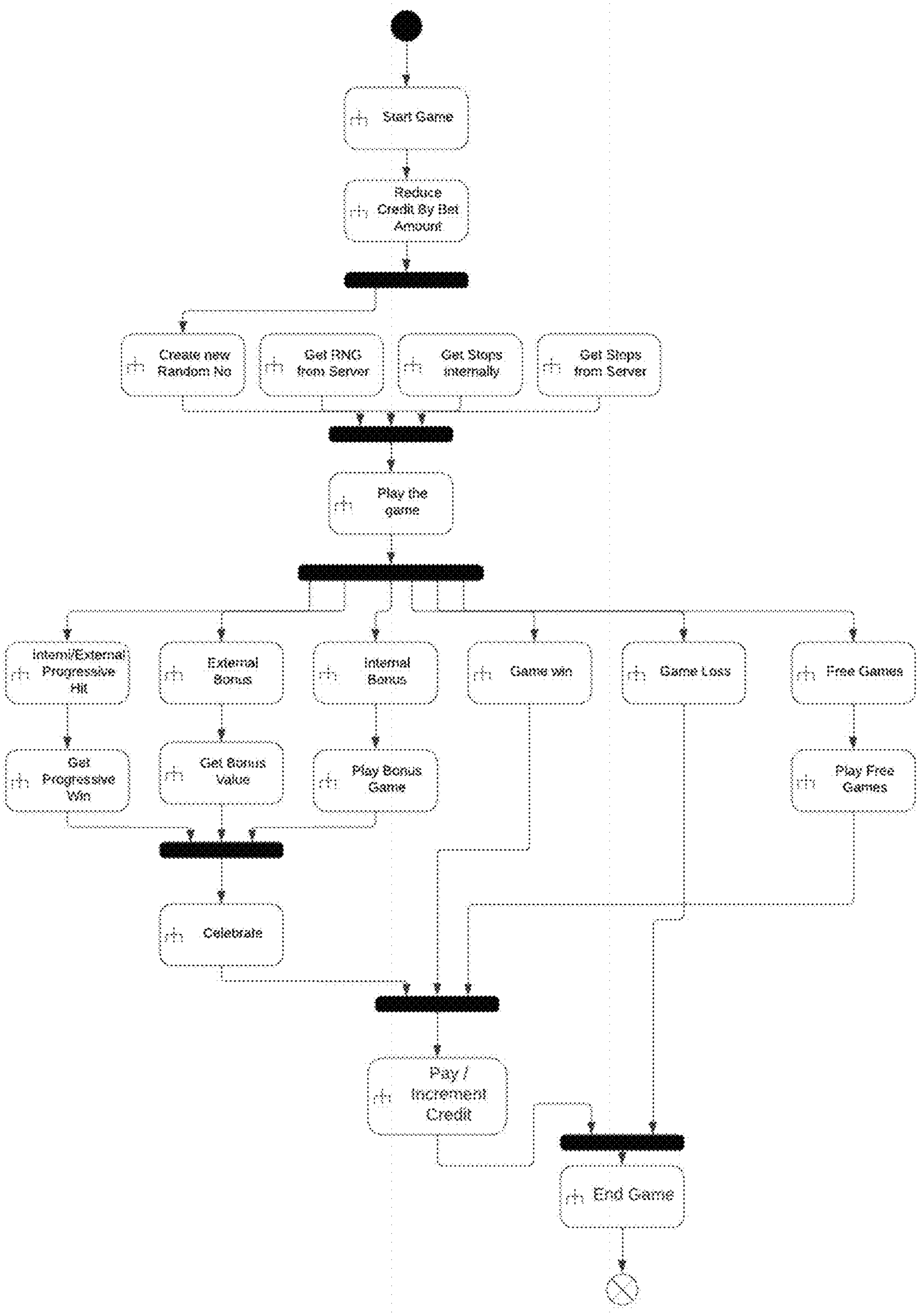
FIG. 7B illustrates a flow chart describing the process of the gameplay illustrated in FIG. 6C.

FIG. 7B illustrates a flow chart describing the process of the gameplay illustrated in FIG. 6C. As shown in FIG. 7B, a game goes through several stages:

Betting Stage: The player selects lines, boxes, or rotators for bet (See FIG. 8 for further details).

Playing Stage: Once the player presses the play button, the game obtains random numbers or final stops of the rotators. The random numbers can be generated internally or obtained from a remote server. In one embodiment, when the user clicks on the play button, a new random number is generated locally and is used by local processors to calculate the final stops of the rotators. In another embodiment, the random number is received from the remote server and is used by local processors to calculate the final stops of the rotators. In other embodiment, the random number with calculated final stops of the rotators are received from the remote server. In one embodiment, the final stops of the rotators are based on the prize of the game.

In one embodiment, instead of obtaining the random numbers or final stops of the rotators for the entire game, each rotator can obtain its own random number or final stop. That is, each rotator can be independent.

Determining Stage: Based on the choices made before the bet (i.e. lines, boxes, rotators, and the final stop of the rotators), the game will generate an award/prize. The award is based on the game design that varies from game to game. In one embodiment, the award can be one or more of the following types: internal progressive (stand-alone progressive), external progressive using a controller, internal bonus game which may or may not lead to bonus game, external bonus award (awarded based on external factors not related to game outcome), a simple game wins, free games, or a loss.

Paying Stage: Once the award/prize is determined, a determination is made to whether showing a celebration animation based on the award and the amount to be credited to the player. If the award is above tax limits, attendant will provide tax forms and the amount may be handed to the player.

End Stage: During this stage the game updates and stores its parameters internally, and returns to the Betting Stage or the Playing Stage.

When a game is started, the bet amount is automatically changed to a predetermined minimal amount to avoid the user to accidentally starting a large play. This is necessary in certain jurisdictions.

Figure 8:
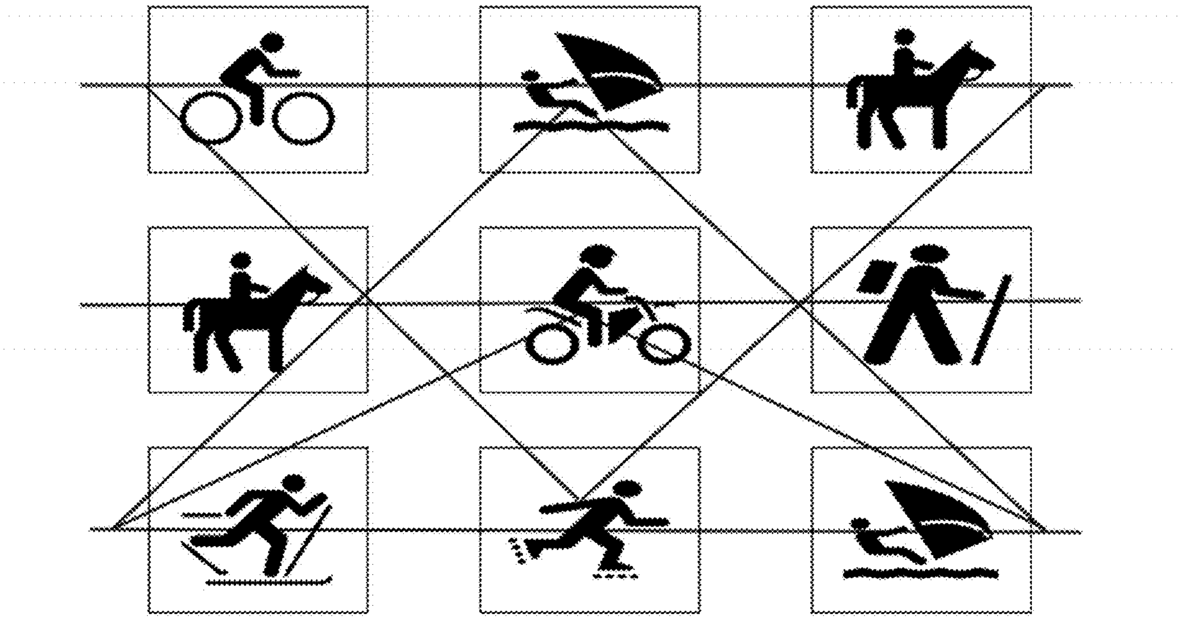
FIG. 8 illustrates bet lines and bet boxes of the game.
Figure 8:
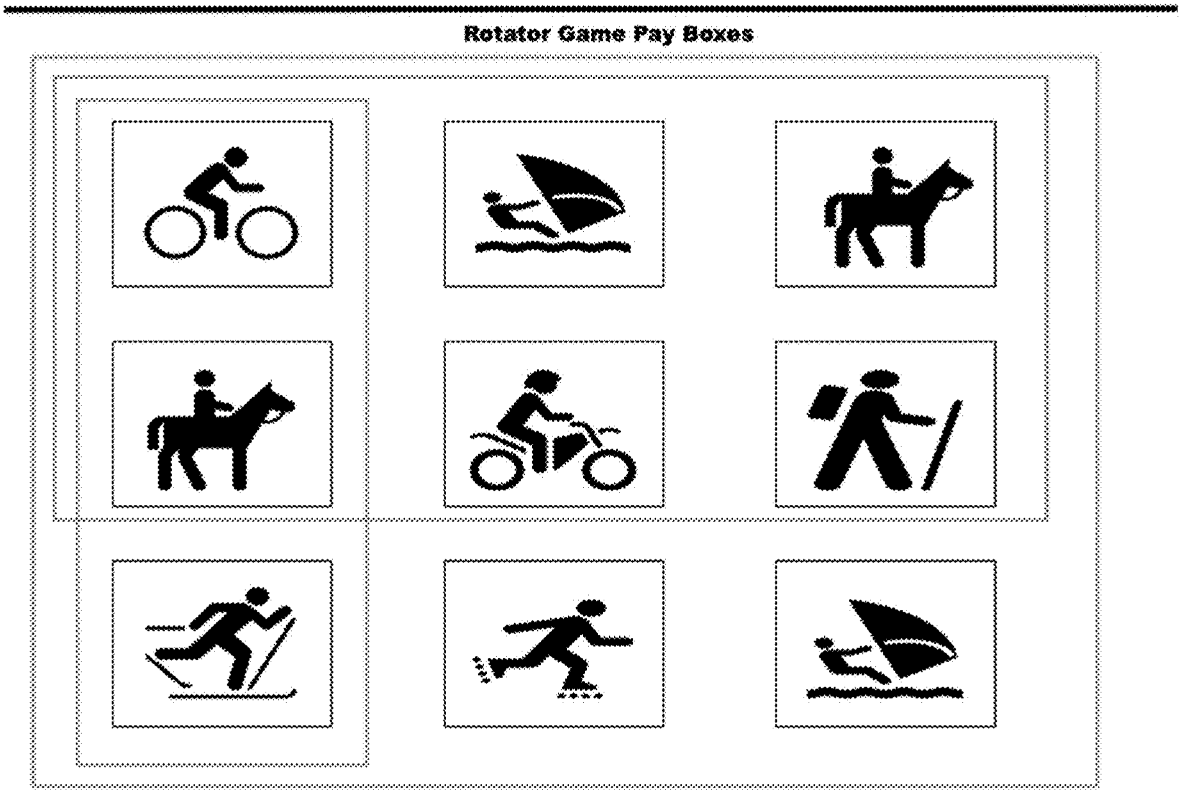

FIG. 8 illustrates bet lines and bet boxes of the game. As shown in FIG. 8, the upper figure shows the bets lines. The bottom figure shows bet boxes. The game can allow betting of multimedia elements in a vertical box or a vertical line. In one embodiment, the game can also allow betting of multimedia elements within two or more rows/columns of rotators. The winning combination depends on the game. For most games, winning combination would be same image. In other game it can be different. For example, in a game with cards, it can be Royal Flush, 4 of a kind, etc. Bets are allowed to be designated to one or more rows and columns. Moreover, the game also allows betting of a single rotator because each rotator can be independent. In this case player can rotate the rotator and select a single image to bet on. Player can also select specific images in multiple rotators and bet on it. This is unique to rotator games because each rotator can obtain random values independently.

Those skilled in the art will appreciate that the herein described systems and devices may be subject to various modifications and alternative constructions. There is no intention to limit the scope of the invention to the specific constructions described herein. Rather, the herein described systems and devices are intended to cover all modifications, alternative constructions, and equivalents falling within the scope and spirit of the invention and its equivalents.

The invention claimed is:

1. A slot wagering game device, comprising:
- a processor;
- a memory storing computer readable instructions;
- a display;
- a user interface including a play button;
- wherein when the computer readable instructions are executed by the processor, cause the device to:
  - generate, by the processor, information about a plurality of rotators and multimedia elements associated with each rotator of the plurality of rotators;
  - present the plurality of rotators on the display, wherein each rotator of the plurality of rotators has at least two sides; each of the at least two sides is associated to a corresponding one of the multimedia elements, and one of the at least two sides rotated to a back of the rotator is not displayed, and wherein the plurality of rotators are arranged in a table format with at least one row and at least one column;
  - generate and maintain, by the processor, a hidden list for each rotator, wherein the hidden list contains a list of multimedia elements;
  - when the play button is pushed, the processor reading from the memory information about how to rotate each of the plurality of rotators;
  - rotate each of the plurality of rotators and stop each of the plurality of rotators at a new position based on the information about how to rotate each of the plurality of rotators, wherein each time a side of a rotator is rotated to the back of the rotator, the side is re-associated to a different multimedia element selected from the hidden list;
  - provide a game generating graphic user interface to a user, wherein the game generating graphic user interface shows to the user a list of multimedia elements to be used by the plurality of rotators; the plurality of rotators are two-dimensional (2D) or three-dimensional (3D) rotators; the graphic user interface further presents dropdown menus or text input fields to receive inputs from the user on number of sides, game matrix rows, game matrix columns, background, rotation type, width, height, and depth;
  - populating the list of multimedia elements into the plurality of rotators based on the number of sides, the game matrix rows, the game matrix columns, the background, the rotation type, the width, the height, and the depth inputted by the user;
  - adjusting sizes of the plurality of rotators to accommodate a size of a game screen of the display by adjusting spaces between the plurality of rotators when the size of the game screen changes; and
  - displaying a populated result for each of the plurality of rotators and a celebration animation based on an award and an amount to be credited to the user on the game generating graphic user interface.

2. The slot wagering game device according to claim 1, wherein the multimedia elements comprise at least one of an image, a symbol, an animation, or a video; and wherein the plurality of rotators are two-dimensional (2D) and/or three-dimensional (3D) rotators and each of the plurality of rotators rotator has different number of sides, heights, widths, and depths, and the heights, widths, and depths are adjustable during or between rotations.

3. The slot wagering game device according to claim 1, wherein the plurality of rotators include at least one two-dimensional (2D) rotator and/or at least one three-dimensional (3D) rotator in a game; and wherein the plurality of rotators are 2D and/or 3D representation of cylinders, cones, or polyhedranes; and when the plurality of rotators include at least one two-dimensional 2D rotator and at least one three-dimensional 3D rotator in a game, a stop of a rotation of the at least one 2D rotator triggers the at least one 3D rotator to rotate.

4. The slot wagering game device according to claim 1, wherein at least one of the plurality of rotators rotates clockwise and/or at least one of the plurality of rotators rotates counterclockwise in a game.

5. The slot wagering game device according to claim 1, wherein at least one rotator of the plurality of rotators has at least three sides, with two of the at least three sides being a top view of the at least one rotator, and a bottom view of the at least one rotator shown on the display.

6. The slot wagering game device according to claim 1, wherein each rotator of the plurality of rotators are presented in an orthogonal projection with respect to a user's eye.

7. The slot wagering game device according to claim 1, wherein each rotator of the plurality of rotators are presented in a perspective projection with respect to a user's eye.

8. The slot wagering game device according to claim 1, wherein at least one rotator of the plurality of rotators is a hidden rotator configured to be shown according to a predetermined event;

wherein at least one rotator of the plurality of the rotators is presented in wavy motions; and wherein the multimedia element is a blank image, a wild image, or a scatter image.

9. The slot wagering game device according to claim 1, wherein the computer readable instructions further configure the processor to display a background based on different seasons or different holidays, wherein the background is a moving background comprising a moving image and/or a video.

10. The slot wagering game device according to claim 1, wherein the user interface further includes a change bet button configured to receive a new betting value from a user and a change line button configured to receive a modification of a betting line from the user, and wherein the modification of the betting line includes setting a vertical betting line.

11. The slot wagering game device according to claim 1, wherein the computer readable instructions further configure the processor to:

provide a math calculation graphic user interface to the user, wherein the math calculation graphic user interface comprises:

a pay value section displaying multiple pay value fields for each of the multimedia elements, wherein each of the multiple pay value fields contains a pay value set by the user, and the pay value indicates a reward credit amount when the corresponding multimedia element appears a predetermined number of times in a winning line;

a probability calculation section displaying a probability for each pay value to be triggered and paid out;

a line setting section displaying a visual representation of a line set among the plurality of rotators, wherein the line set includes a number of lines set by the user, and each line includes a plurality of locations; and a theoretical percentage section displaying a theoretical percentage number indicating a percentage of the credit estimated to be paid out among credits received by the slot wagering game device;

provide the user with accesses to the game generating graphic user interface and the math calculation graphic user interface, wherein a game is created by the user entering parameters in the game generating graphic user interface using information calculated from the math calculation graphic user interface.

12. The slot wagering game device according to claim 11, wherein the pay value section includes a scroller allowing the user to scroll up and down to view each of the plurality of multimedia elements and to set corresponding pay values for each of the plurality of multimedia elements.

13. The slot wagering game device according to claim 11, wherein the probability calculation section further includes a calculate button and a save math button, wherein the calculate button allows the user to calculate probabilities according to the pay values entered in the pay value section, and the save math button allows the user to store the calculated probabilities into the memory.

14. The slot wagering game device according to claim 11, wherein the line setting section further comprises a line set name field, a line name field, a add line button, a clear line button, a show line button, a reset button, and a clear line set button, wherein the line set name field allows the user to name the line set, the line name field allows the user to name a line, the add line button allows the user to add a line to the line set, the clear line button allows the user to remove a line from the line set, the show line button allow the user to trigger a display of a line in a graph indicating locations included in the line, the reset button allows the user to reset the locations included in the line, and the clear line set button allows the user to empty the line set.

15. The slot wagering game device according to claim 11, wherein the theoretical percentage displayed in the theoretical percentage section is calculated based on the pay values in the pay value section, the line set in the line setting section, and the probabilities in the probability calculation section.

16. The slot wagering game device according to claim 11, wherein the number of the plurality of rotators and a number of sides of the plurality of rotators are generated based on the pay values in the pay value section, the line set in the line setting section, the probabilities in the probability calculation section, and the theoretical percentage in the theoretical percentage section.

17. The slot wagering game device according to claim 11, wherein the game generating graphic user interface and the math calculation graphic user interface are used together to create games with predetermined probability parameters; and wherein the game generating graphic user interface further enables the user to include additional parameters comprising sound features and new game features.

18. A slot wagering game machine, comprising:

a plurality of rotators;

multimedia elements associated with each rotator of the plurality of rotators;

a hidden list for each rotator, wherein the hidden list contains a portion of the multimedia elements;

a play button; and a game generating graphic user interface;

wherein each rotator of the plurality of rotators has at least two sides; each of the at least two sides is associated to a corresponding one of the multimedia elements, and wherein the plurality of rotators are arranged in a table format with at least one row and at least one column;

when the play button is pushed, each of the plurality of rotators are rotated and then stopped at a new position based on stored information about how to rotate each of the plurality of rotators;

each time a side of a rotator is rotated to the back of the rotator, the side is re-associated to a different multimedia element selected from the hidden list;

the game generating graphic user interface shows to the user a list of multimedia elements to be used by the plurality of rotators; the plurality of rotators are two-dimensional (2D) or three-dimensional (3D) rotators; the graphic user interface further presents dropdown menus or text input fields to receive inputs from the user on number of sides, game matrix rows, game matrix columns, background, rotation type, width, height, and depth;

the game generating graphic user interface is configured to populate the list of multimedia elements into the plurality of rotators based on the number of sides, the game matrix rows, the game matrix columns, the background, the rotation type, the width, the height, and the depth inputted by the user;

the game generating graphic user interface is further configured to adjust sizes of the plurality of rotators to accommodate a size of a game screen of the display by adjusting spaces between the plurality of rotators when the size of the game screen changes; and the game generating graphic user interface is further configured to display a populated result for each of the plurality of rotators and a celebration animation based on an award and an amount to be credited to the user.

19. The slot wagering game machine according to claim 18, wherein the multimedia elements comprise at least one of an image, a symbol, an animation, or a video; and wherein the plurality of rotators are two-dimensional (2D) and/or three-dimensional (3D) rotators and each of the plurality of rotators rotator has different number of sides, heights, widths, and depths, and the heights, widths, and depths are adjustable during or between rotations;

at least one of the plurality of rotators rotates clockwise and/or at least one of the plurality of rotators rotates counterclockwise in a game; and the multimedia elements include a blank image, a wild image, or a scatter image.

* * * * *